(12) United States Patent
Rouillon

(10) Patent No.: US 11,015,714 B2
(45) Date of Patent: May 25, 2021

(54) DRY GAS SEAL WITH ELECTRONICALLY CONTROLLED CARRIER LOAD

(71) Applicant: John Crane UK Ltd., Slough (GB)

(72) Inventor: Raphael Rouillon, Slough (GB)

(73) Assignee: JOHN CRANE UK LTD., Slough (GB)

( * ) Notice: Subject to any disclaimer, the term of this patent is extended or adjusted under 35 U.S.C. 154(b) by 0 days.

(21) Appl. No.: 16/863,063

(22) Filed: Apr. 30, 2020

(65) Prior Publication Data
US 2020/0256468 A1 Aug. 13, 2020

Related U.S. Application Data

(62) Division of application No. 15/980,371, filed on May 15, 2018, now Pat. No. 10,677,357.

(60) Provisional application No. 62/598,239, filed on Dec. 13, 2017, provisional application No. 62/506,196, filed on May 15, 2017.

(51) Int. Cl.
*F16J 15/34* (2006.01)

(52) U.S. Cl.
CPC ......... *F16J 15/3444* (2013.01); *F16J 15/346* (2013.01); *F16J 15/3452* (2013.01); *F16J 15/3492* (2013.01)

(58) Field of Classification Search
CPC .... F16J 15/3444; F16J 15/3452; F16J 15/346; F16J 15/3492; F16J 15/40; F16K 31/06; F16K 31/06
See application file for complete search history.

(56) References Cited

U.S. PATENT DOCUMENTS

| | | | |
|---|---|---|---|
| 2,128,744 A | 8/1938 | Hornschuc | |
| 2,257,011 A | 9/1941 | Hillier | |
| 2,531,079 A | 11/1950 | Payne | |
| 2,984,507 A | 5/1961 | Welch | |
| 3,467,396 A | 9/1969 | Hershey | |

(Continued)

FOREIGN PATENT DOCUMENTS

| CN | 203321897 U | 12/2013 |
|---|---|---|
| DE | 3843288 A1 | 6/1990 |

(Continued)

OTHER PUBLICATIONS

American Petroleum Institute, API Standard 682 4th Edition, "PumpsShaft Sealing Systems for Centrifugal and Rotary Pumps", May 201, 268 pages.

(Continued)

*Primary Examiner* — Gilbert Y Lee
(74) *Attorney, Agent, or Firm* — Cantor Colburn LLP

(57) ABSTRACT

A mechanical seal assembly with an electronically controllable carrier load. The assembly includes a magnetic ring affixed to the carrier and driven by a solenoid. The solenoid can apply an axial force to the carrier. The carrier load can be controlled to prevent or reduce friction between the primary ring and mating ring in slow-roll running conditions by partially or completely compensating a spring force provided by a biasing mechanism. The carrier load can further be controlled to inhibit seal hang-up. In embodiments, desired the carrier load can be determined by rotational speed. In embodiments, carrier load can be determined based on sensor signals.

5 Claims, 28 Drawing Sheets

(56) References Cited

U.S. PATENT DOCUMENTS

| | | |
|---|---|---|
| 3,589,738 A | 6/1971 | Tracy |
| 3,632,117 A | 1/1972 | Villasor |
| 3,751,045 A | 8/1973 | Lindeboom |
| 3,994,503 A | 11/1976 | Dousse et al. |
| 4,183,540 A | 1/1980 | Hytonen |
| 4,212,475 A | 7/1980 | Sedly |
| 4,395,048 A | 7/1983 | Timmermans et al. |
| 4,406,466 A | 9/1983 | Geary, Jr. |
| 4,447,063 A | 5/1984 | Kotzur et al. |
| 4,768,790 A | 9/1988 | Netzel et al. |
| 4,872,689 A | 10/1989 | Drumm |
| 4,993,917 A | 2/1991 | Kulle et al. |
| 5,039,113 A | 8/1991 | Gardner |
| 5,058,905 A | 10/1991 | Nosowicz et al. |
| 5,066,026 A | 11/1991 | Heck et al. |
| 5,137,284 A | 8/1992 | Holder |
| 5,141,389 A | 8/1992 | Bear et al. |
| 5,158,431 A | 10/1992 | Schellong et al. |
| 5,180,173 A | 1/1993 | Kimura et al. |
| 5,224,714 A | 7/1993 | Kimura et al. |
| 5,275,421 A | 1/1994 | Hornsby |
| 5,421,593 A | 6/1995 | Aritsubo et al. |
| 5,443,274 A | 8/1995 | Fuse |
| 5,496,047 A | 3/1996 | Goldswain et al. |
| 5,664,789 A | 9/1997 | Hayashi |
| 5,700,013 A | 12/1997 | Baty |
| 5,718,560 A | 2/1998 | Lorenzen |
| 5,823,539 A | 10/1998 | Rockwood |
| 5,899,460 A | 11/1999 | Altieri |
| 6,065,345 A | 5/2000 | Holenstein et al. |
| 6,142,478 A | 11/2000 | Pecht et al. |
| 6,347,800 B1 | 2/2002 | Auber |
| 6,425,583 B1 | 7/2002 | Muraki |
| 6,431,551 B1 | 8/2002 | Fuse et al. |
| 6,494,458 B2 | 12/2002 | Uth |
| 6,517,077 B1 | 2/2003 | Enomura |
| 6,524,059 B1 | 2/2003 | Nogiwa |
| 6,565,095 B2 | 5/2003 | Meacham |
| 6,623,012 B1 * | 9/2003 | Perry ............... F02M 25/0809 251/334 |
| 6,655,693 B2 | 12/2003 | Hosanna et al. |
| 6,746,019 B1 | 6/2004 | Liebenberg et al. |
| 6,905,123 B2 | 6/2005 | Goldswain |
| 8,185,326 B2 | 5/2012 | Safai et al. |
| 8,651,801 B2 | 2/2014 | Shamseldin et al. |
| 9,138,805 B2 | 9/2015 | Wodrich |
| 10,132,412 B2 | 11/2018 | Matheidas et al. |
| 2003/0015842 A1 | 1/2003 | Wilhelm |
| 2005/0024174 A1 | 2/2005 | Kolb et al. |
| 2007/0267820 A1 | 11/2007 | Martin |
| 2008/0042364 A1 | 2/2008 | Zheng et al. |
| 2008/0047756 A1 | 2/2008 | Hooper |
| 2009/0290971 A1 | 11/2009 | Shamseldin et al. |
| 2010/0072706 A1 | 3/2010 | Schmitz et al. |
| 2010/0150715 A1 | 6/2010 | Howard et al. |
| 2013/0259679 A1 | 10/2013 | Brailean |
| 2014/0161587 A1 | 6/2014 | Shamseldin et al. |
| 2015/0377362 A1 | 12/2015 | Lin et al. |
| 2017/0045144 A1 | 2/2017 | Khaira et al. |
| 2017/0356550 A1 | 12/2017 | Rouillon |
| 2018/0038488 A1 | 2/2018 | Matheidas et al. |
| 2018/0209545 A1 | 7/2018 | Leal |

FOREIGN PATENT DOCUMENTS

| | | |
|---|---|---|
| EP | 0499370 A1 | 8/1992 |
| EP | 00335497 B1 | 4/1993 |
| EP | 0578377 A1 | 1/1994 |
| EP | 1918618 B1 | 1/2011 |
| FR | 2563583 A1 | 10/1985 |
| GB | 1309865 A | 3/1973 |
| GB | 1497257 A | 1/1978 |
| GB | 2167141 A1 | 5/1986 |
| JP | 2011185326 A | 9/2011 |
| WO | 9615397 A1 | 5/1996 |
| WO | 9927281 A1 | 6/1999 |
| WO | 0075540 A1 | 12/2000 |
| WO | 2009022134 A1 | 2/2009 |
| WO | 2017214542 A1 | 12/2017 |

OTHER PUBLICATIONS

Application and File History for U.S. Appl. No. 15/618,531, filed Jun. 9, 2017. Inventor: RaphaelRouillon.

Communication dated Dec. 22, 2003 for EP Application No. 03075287.7, 3 pages.

ImechE Guides for Process Industries, "Mechanical Seal Practice for Improved Performance", 1992, 32 pages.

International Preliminary Report on Patentability for Application No. PCT/US2018/032774, dated Nov. 28, 2019, 16 pages.

Search Report and Written Opinion dated Aug. 29, 2017 for PCT Application No. PCT/US2017/036807, 12 pages.

Search Report and Written Opinion dated Jun. 15, 2018 for PCT Application No. PCT/US2018/014455, 13 pages.

Search Report and Written Opinion dated May 15, 2018 for PCT Application No. PCT/US2018/032774, 20 pages.

EP Search Report for Application No. 18801704.0/1015, dated Jan. 25, 2021, 10 pages.

* cited by examiner

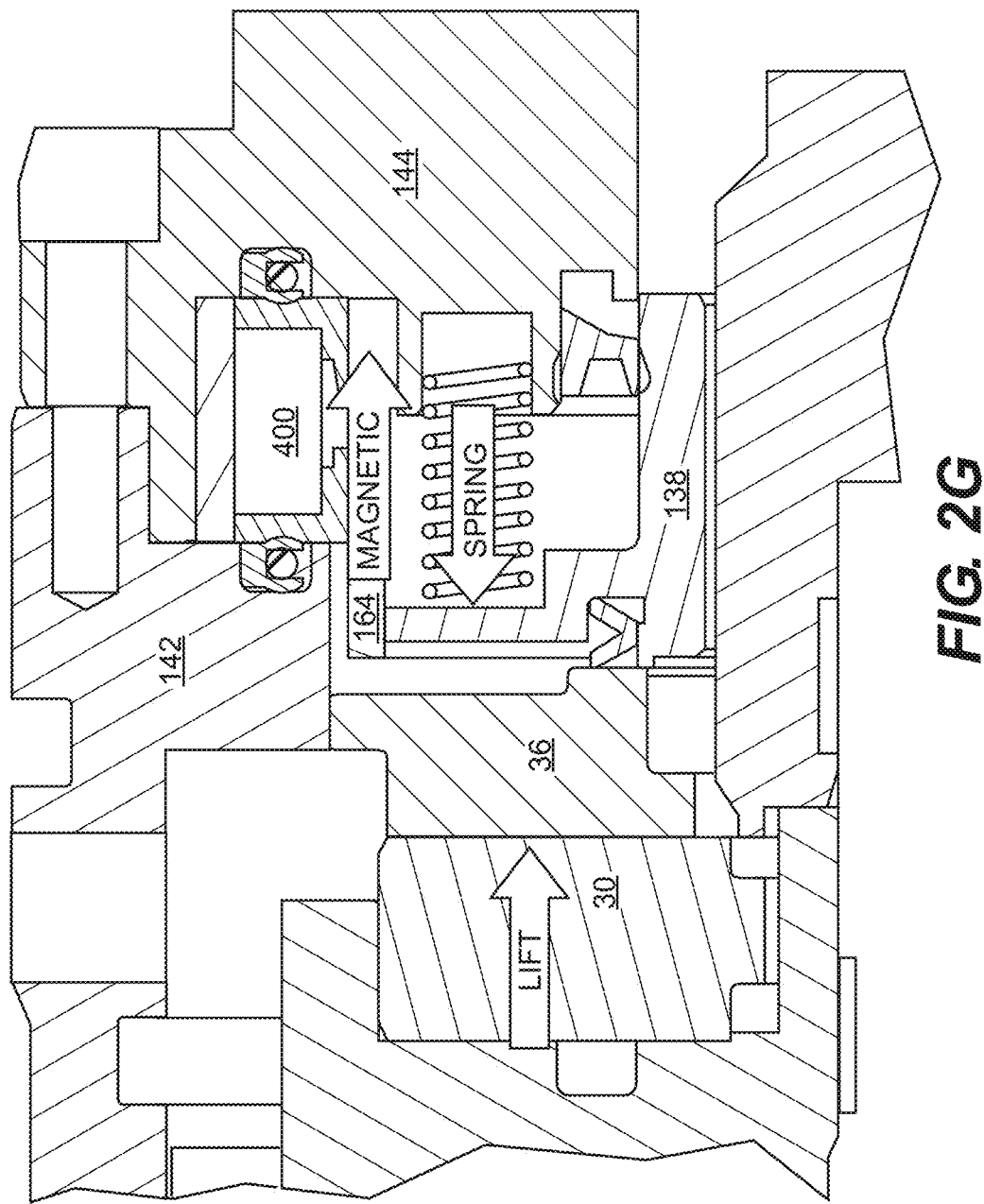

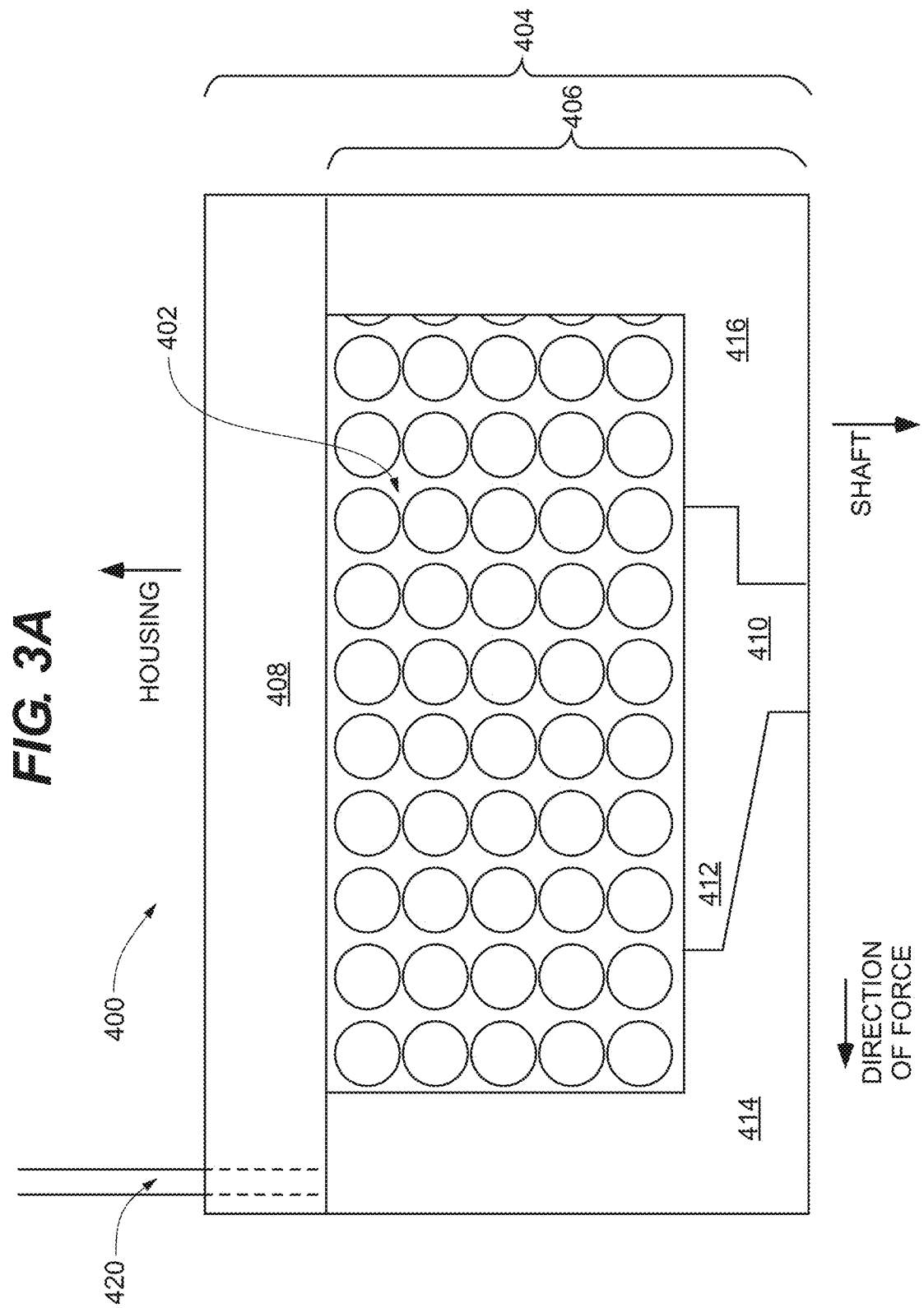

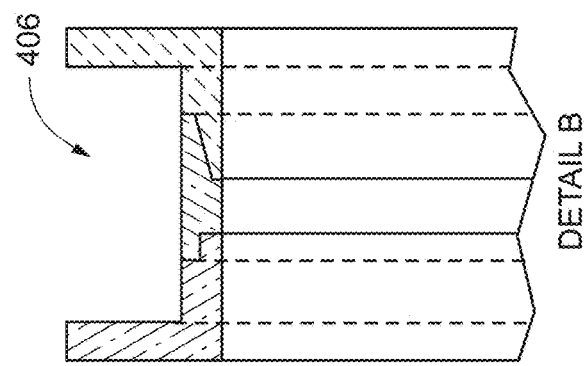
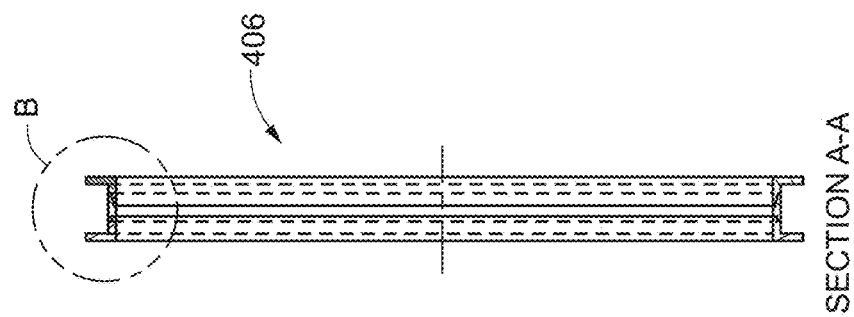
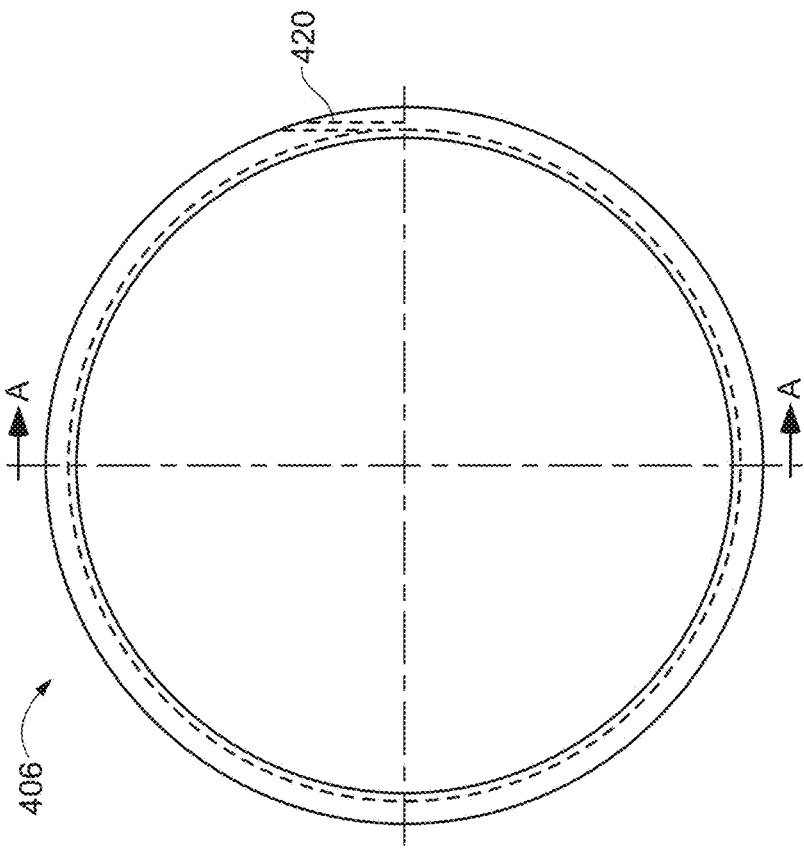

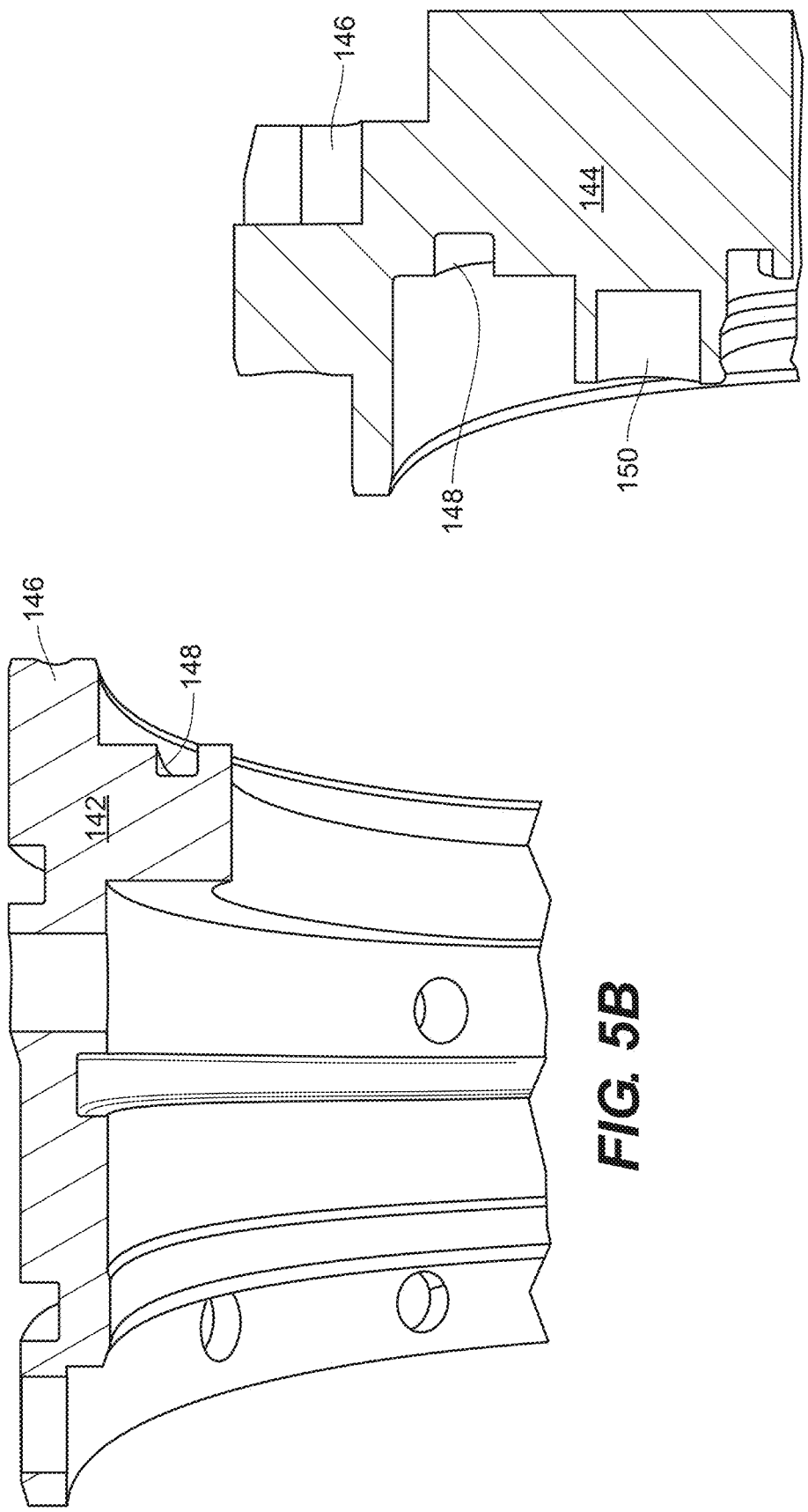

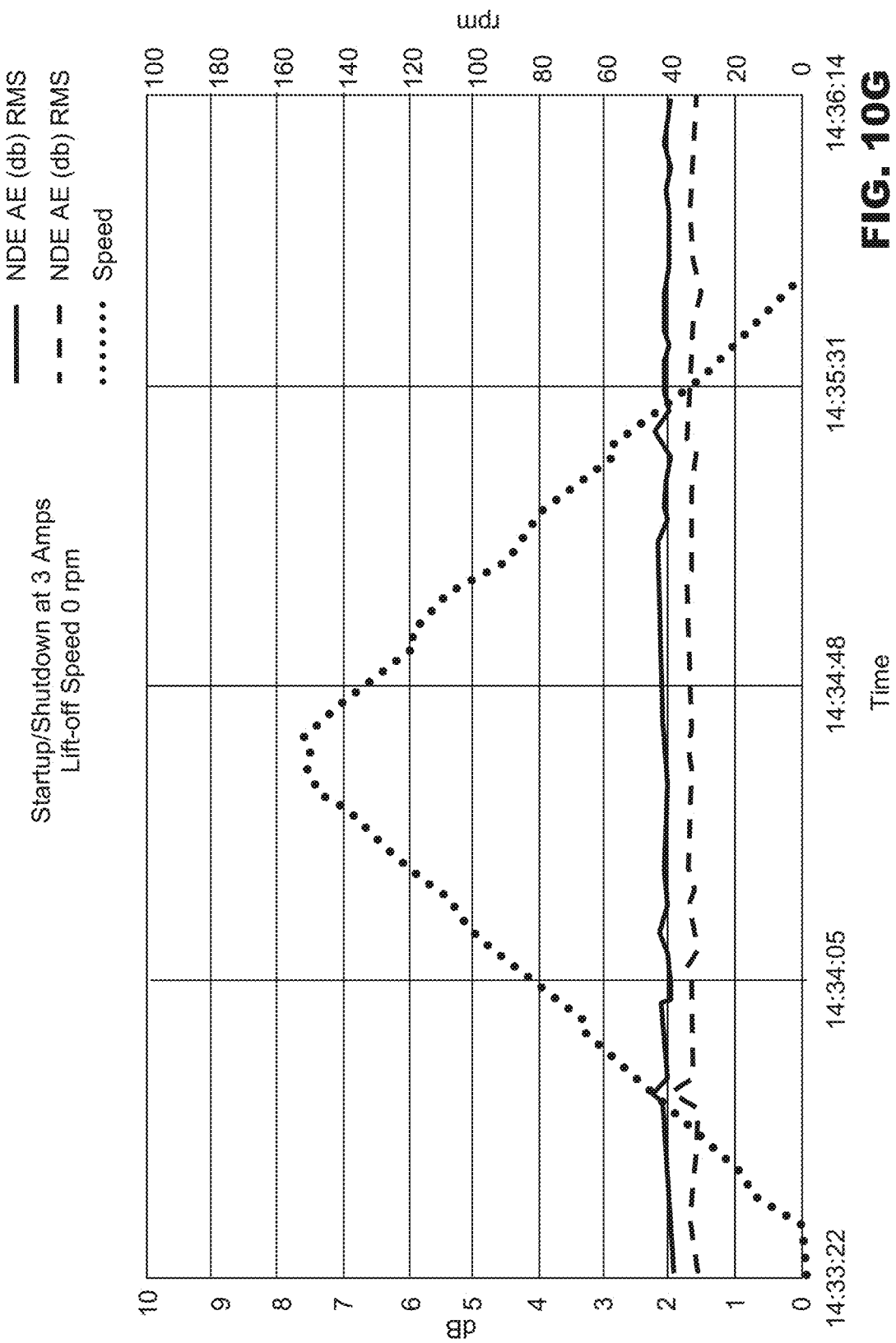

DRY GAS SEAL WITH ELECTRONICALLY CONTROLLED CARRIER LOAD

RELATED APPLICATIONS

This application is a divisional of U.S. patent application Ser. No. 15/980,371, filed May 15, 2018 which claims the benefit of U.S. Provisional Application No. 62/506,196 filed May 15, 2017, and U.S. Provisional Application No. 62/598,239 filed Dec. 13, 2017, each of which are hereby incorporated by reference herein.

TECHNICAL FIELD

The present disclosure relates to mechanical seals, specifically gas-lubricated dry seals configured to seal a connection between a spinning shaft and a static housing, such as in compressors. More particularly, it relates to an electromagnetically controlled carrier to reduce wear on seal faces.

BACKGROUND

Gas lubricated mechanical face seals, such as those described in U.S. Pat. Nos. 5,222,743 and 5,496,047 (the disclosures of which are incorporated by reference herein) rely on a cushion of seal gas built up between the sealing faces in order to provide lubrication, and thereby inhibit contact between the faces. In many applications, this lubricating gas is the process or product gas that is being compressed or processed by the mechanical energy transmitted by the spinning shaft. Depending on the application, such seals can be designed to operate at pressures up to 500 bar and speeds up to 30,000 rpm.

Non-contacting, dry-running mechanical seals generally include one or more seal interfaces defined by a mating (rotating) ring, fixable to a shaft, and a primary (stationary) ring, fixable to a housing. A seal interface is maintained, in part, by preloaded springs (or other biasing mechanism) arranged to urge the primary ring towards the mating ring. The springs often have sufficient force to push the primary ring into actual contact with the mating ring when the shaft is not rotating, or is rotating slowly (i.e., in standstill or slow roll conditions, respectively). When the rotating speed of the shaft is sufficiently high, grooves provided in the mating ring create sufficient fluid dynamic force to separate the primary ring from the mating ring, creating a gap between the two rings through which the lubricating gas can flow. The threshold (or lift-off) speed is dependent on various aspects of the seal design, however such thresholds are generally around 200 rpm.

In slow roll conditions, the fluid dynamic force is insufficient to overcome the spring force provided by the biasing mechanism to separate the primary and mating rings, which will then frictionally rotate against each other. This rubbing can lead to excessive heat generation and premature seal wear. Conventional approaches to limiting wear in slow roll conditions have included the application of a diamond-like carbon (DLC) coating to the seal faces. The DLC coating however requires an additional manufacturing step, and may not be sufficiently durable for all applications.

Another area of concern for mechanical seals is hang-up. Hang-up occurs when the primary ring becomes stuck in an axial position, wherein the spring preload force behind the carrier is insufficient to overcome a very high friction between the carrier and a sealing element arranged at the balance diameter. Hang-up is especially problematic where a seal system does not include an efficient gas conditioning unit, such that dirty hydrocarbon gas can migrate to the gas seal, where it can condense and build up on the sliding surface of the carrier in the balance diameter sealing element area, inhibiting the free movement of the carrier and primary ring. This can cause the carrier and primary ring to stick (or "hang-up"), either in the steady state position (resulting in a large seal face gap at start-up and the resultant excessive leakage as the casing pressurizes), or in the stand-still position (resulting in face contact and unacceptable face wear).

SUMMARY

The present disclosure pertains to a mechanical seal assembly, such as a dry gas seal with an electromagnetically controllable carrier load, and includes a magnetic ring, driven by an annular solenoid, arranged to modulate an axial force on the carrier. The axial force on the carrier can be modulated to counteract the spring load of the biasing mechanism. In embodiments, the axial force can reduce the friction between seal rings in slow roll running conditions. In embodiments, the axial force can be modulated to prevent carrier hang-up. The solenoid can provide a magnetic force to urge a magnetic ring axially. The magnetic ring can be operably coupled to the carrier, such that the magnetic force operates to counter the preloaded spring force of a biasing mechanism to prevent or lessen urging of a primary ring towards a mating ring of the seal. In embodiments, a desired axial force can be determined by rotational speed. In embodiments, the axial force can be determined based on sensor inputs. Because the carrier ring position can be controlled to lessen or prevent frictional contact between primary and mating rings at slow speeds, DLC coating of either or both of the primary and mating rings is not required in embodiments.

Embodiments of the present disclosure include a mechanical seal assembly for coaxial arrangement around a rotatable shaft of a machine to inhibit emission of a pressurized gas from within the machine. The mechanical seal assembly can comprise a rotating ring that is operably coupleable to the rotatable shaft, and presents a first annular seal face. A primary ring that is axially shiftable relative to the rotating ring can present a second annular seal face that is oriented in opposed juxtaposition to the first annular seal face. A variable-width seal interface is therefore defined between the first annular seal face and the second annular seal face.

The mechanical seal assembly can further include an annular carrier that is axially shiftable with, and juxtaposed to, the primary ring opposite the second annular seal face. An annular magnetic ring that includes a ferromagnetic portion can be operably coupled to the carrier. In embodiments, the magnetic ring can be operably coupled to the outer diameter of the carrier.

A magnetic actuator that comprises an annular solenoid can be arranged coaxially about at least a portion of the outer diameter of the magnetic ring. The solenoid can be electrically coupleable to a controller such that the solenoid selectively produces a uniform magnetic field to urge the carrier axially. The uniform magnetic field can urge the carrier axially to counteract a spring preload force provided by a biasing mechanism.

In embodiments, one or more sensors can be arranged in or around the mechanical seal assembly. Each sensor can be configured to detect a characteristic indicative of a magnitude of friction between the first annular seal face and the second annular seal face. The controller can be configured to receive the characteristic from each of the one or more sensors and selectively control the magnetic actuator to apply an axial force to achieve a desired magnitude of friction between the first annular seal face and the second annular seal face. In embodiments, the desired magnitude of friction between the first annular seal face and the second annular seal face is the minimum magnitude of friction possible given a maximum quantity of leakage.

In one embodiment, at least one of the one or more sensors can be a temperature sensor and the characteristic indicative of the magnitude of friction can be a temperature detected near the first annular seal face or the second annular seal face. In one embodiment, at least one of the one or more sensors can be a flowmeter and the characteristic indicative of the magnitude of friction can be a quantity of leakage from the seal interface. In one embodiment, at least one of the one or more sensors can be a speed sensor and the characteristic indicative of the magnitude of friction can be the rotational speed of the rotatable shaft. In one embodiment, at least one of the one or more sensors can be a proximity sensor and the characteristic indicative of the magnitude of friction can be a current width of the seal interface. In one embodiment, at least one of the one or more sensors can be an acoustic sensor and the characteristic indicative of the magnitude of friction can be selected from the group consisting of: an amplitude of a noise detected at the seal interface and a frequency of the noise detected at the seal interface. The acoustic sensor can be a microphone and/or a structural vibration detector.

In one embodiment, the controller can be configured to disregard the characteristic provided by the acoustic sensor when the rotational speed of the shaft is less than a certain threshold. In one embodiment, the control can be configured to determine the magnitude of friction based on the characteristic received from the acoustic sensor and at least one second characteristic such as the rotational speed of the shaft, the temperature at the seal interface or the quantity of leakage through the seal interface.

In one embodiment, the solenoid comprises an annular bobbin comprising a non-magnetic spacer at a portion of a radially inward side of the solenoid and a coil comprising a plurality of windings around the bobbin of an electrically conductive and insulated wire.

In one embodiment, the non-magnetic spacer can be configured such that a magnetic portion of the carrier is progressively saturated with magnetic force based on an amplitude of an electrical force (i.e. current) provided by the controller.

Embodiments of the present disclosure include a method of inhibiting hang-up in a mechanical seal assembly. The method can include receiving, at a controller, a signal indicative of shaft stand-still and providing, by the controller, a pulse-width modulated signal to a magnetic actuator, the signal configured to cause the actuator to apply an oscillating axial force to a carrier, wherein the axial force has an amplitude that is sufficient to compensate a spring preload force. The magnetic actuator can comprise an annular solenoid arranged coaxially about at least a portion of the carrier, the solenoid being electrically coupleable to the controller such that the solenoid is selectively magnetic based on the pulse-width modulated signal. The magnetic force can urge the carrier axially outboard from a stationary ring to counteract the spring preload force provided by a biasing mechanism. The axial force can the carrier axially inboard and outboard by about 1 mm. The signal can be further configured to cause the actuator to apply the oscillating axial force to the carrier at a rate between 500 Hz and 1000 Hz. In embodiments, the signal indicative of shaft stand-still can be a shaft rotational speed signal provided by a tachometer or other speed sensing device. In embodiments, the pulse-width modulated signal can be provided in response to receiving a signal indicative of slow roll operation.

Embodiments of the present disclosure further include a method of controlling an axial force on a carrier of a mechanical seal assembly that has a magnetic actuator comprising an annular solenoid arranged coaxially about at least a portion of the carrier, that is electrically coupleable to a controller such that the solenoid selectively produces a uniform magnetic field to urge the carrier axially outboard from a stationary ring to counteract a spring preload force provided by a biasing mechanism. The method can include receiving at the controller, a sensor signal indicative of a level of friction between a first annular seal face and a second annular seal face; and selectively controlling the magnetic actuator to apply an axial force to counter the spring preload force to minimize the level of friction.

Advantages of the disclosed embodiments include providing a longer-lived dry gas seal by inhibiting frictional contact at the sealing interface, while not impacting compressor casing design, and being sized so as to fit existing compressor cavities.

The above summary is not intended to describe each illustrated embodiment or every implementation of the subject matter hereof. The figures and the detailed description that follow more particularly exemplify various embodiments.

BRIEF DESCRIPTION OF THE DRAWINGS

The subject matter hereof may be more completely understood in consideration of the following detailed description of various embodiments in connection with the accompanying figures, in which:

FIG. 2G is a sectional view depicting a mechanical seal assembly, according to an embodiment;

FIG. 3A is a section view depicting a solenoid, according to an embodiment.

FIG. 3B is a plan view depicting a solenoid, according to an embodiment.

FIG. 3C is a section view depicting a solenoid, according to an embodiment.

FIG. 3D is a section view depicting a solenoid, according to an embodiment.

FIG. 5B is a perspective, sectional, view depicting a retainer, according to an embodiment.

FIG. 5C is a perspective, sectional, view depicting a retainer, according to an embodiment.

FIGS. 10A-10I are charts depicting the results of testing embodiments of the present disclosure.

Figure 1:
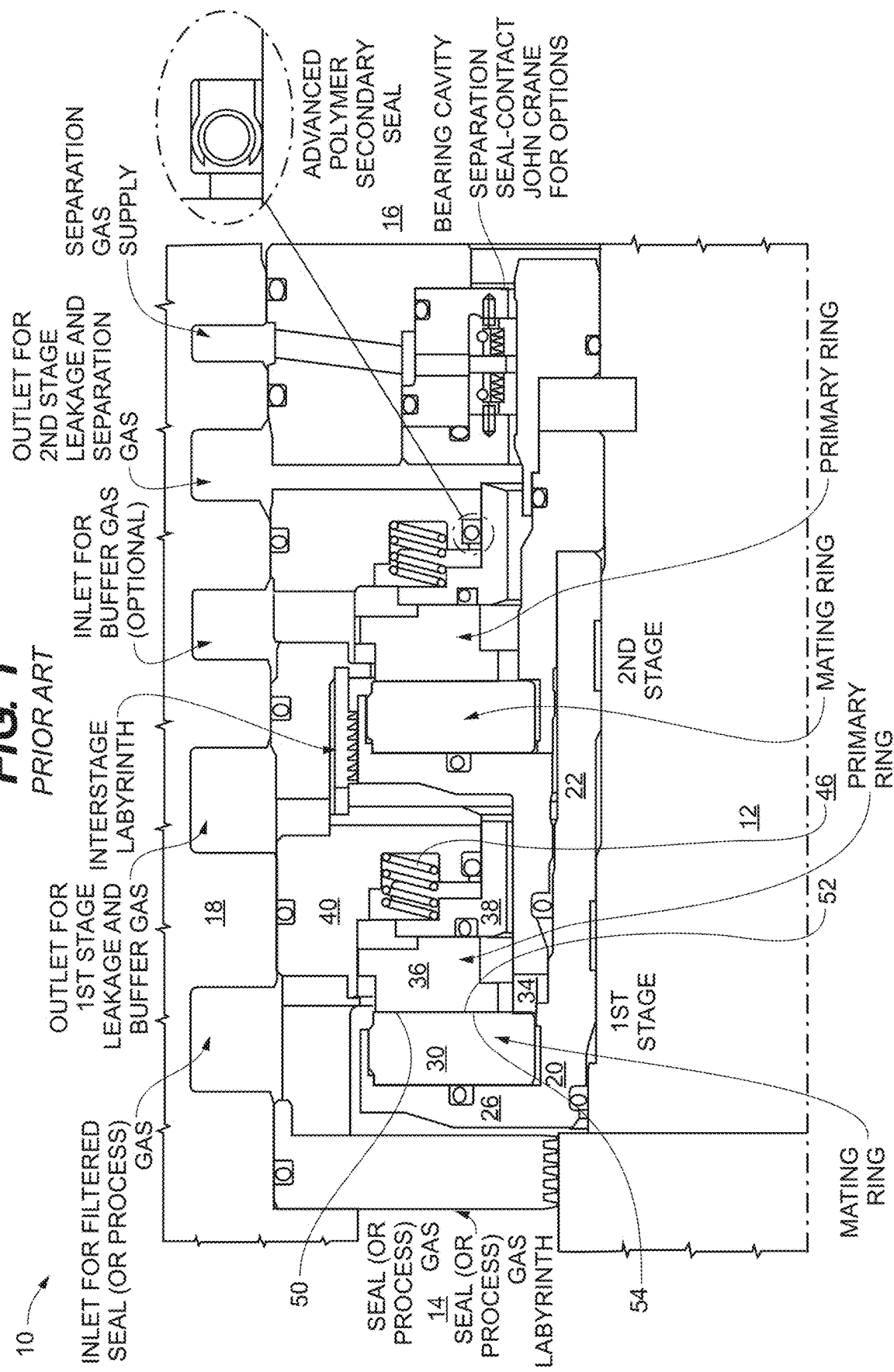
FIG. 1 depicts a cross-sectional view of a typical arrangement of a prior art seal assembly into which an embodiment of the disclosed electronically controlled carrier may be incorporated.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

FIG. 1 is a cross-sectional view depicting a typical arrangement of a tandem dry seal assembly 10 as known in the art. As is common for seals of this type, seal assembly 10 can seal the shaft 12 of a rotating machine such that seal assembly 10 provides a seal between the process chamber 14, containing a fluid such as a pressurized gas and a shaft bearing cavity 16. The seal assembly 10 can be mounted in a generally cylindrical bore (or "seal chamber") defined by the process chamber at an axially inboard end and the bearing chamber at an axially outboard end, and extending radially outward to a housing 18. Seal assembly 10 includes rotating components operably coupled to shaft 12 and stationary components operably coupled to housing 18.

Annular sleeve 20 comprises an axially extending shaft portion 22 which can be operably coupled to the shaft 12 for rotation therewith. Sleeve 20 can comprise a flange portion 26 extending radially outwardly at the inboard end of the seal assembly 10, for arrangement proximal the process chamber 14. As depicted in FIG. 1, shaft portion 22 extends axially outboard of flange portion 26, however shaft portion 22 can extend axially inboard of flange portion 26 in various seal assemblies.

An annular rotating seal ring (or "mating ring") 30 is mounted adjacent the outboard face of flange portion 26. An axially fixed annular member 34 can be mounted on the external diameter of shaft portion 22, abutting rotating seal ring 30, thereby inhibiting axial movement of mating 1 ring 30 outboard from flange portion 26.

An annular stationary seal ring (or "primary ring") 36 is mounted on an annular carrier 38 which is slidably located between annular member 34 and an annular retainer 40 which is secured to housing 18. In the depicted seal, a plurality of radially spaced compression springs 46 act as carrier biasing members between retainer 40 and carrier 38, to urge the primary ring 36 towards the mating ring 30. In other seals known in the art, other carrier biasing mechanisms, such as bellows, are used.

A variable-width seal interface 54 is defined by an outboard facing rotating seal face 50 of rotating mating ring 30 and an inboard facing stationary seal face 52 of primary ring 36. Rotating seal face 50 can comprise a grooved area, such that the rotation of shaft 12 will cause seal gas to be pumped between the faces 50 and 52 of seal rings 30 and 36, respectively, to generate a load which opposes that applied by the springs 46, creating a fluid film to lubricate the sealing faces and provide a seal.

Seal assembly 10 can be a tandem seal, and include a second stage seal including a third and fourth seal face member, which are not described here. Further stage seals and seal face members can also be provided.

Figure 2A:
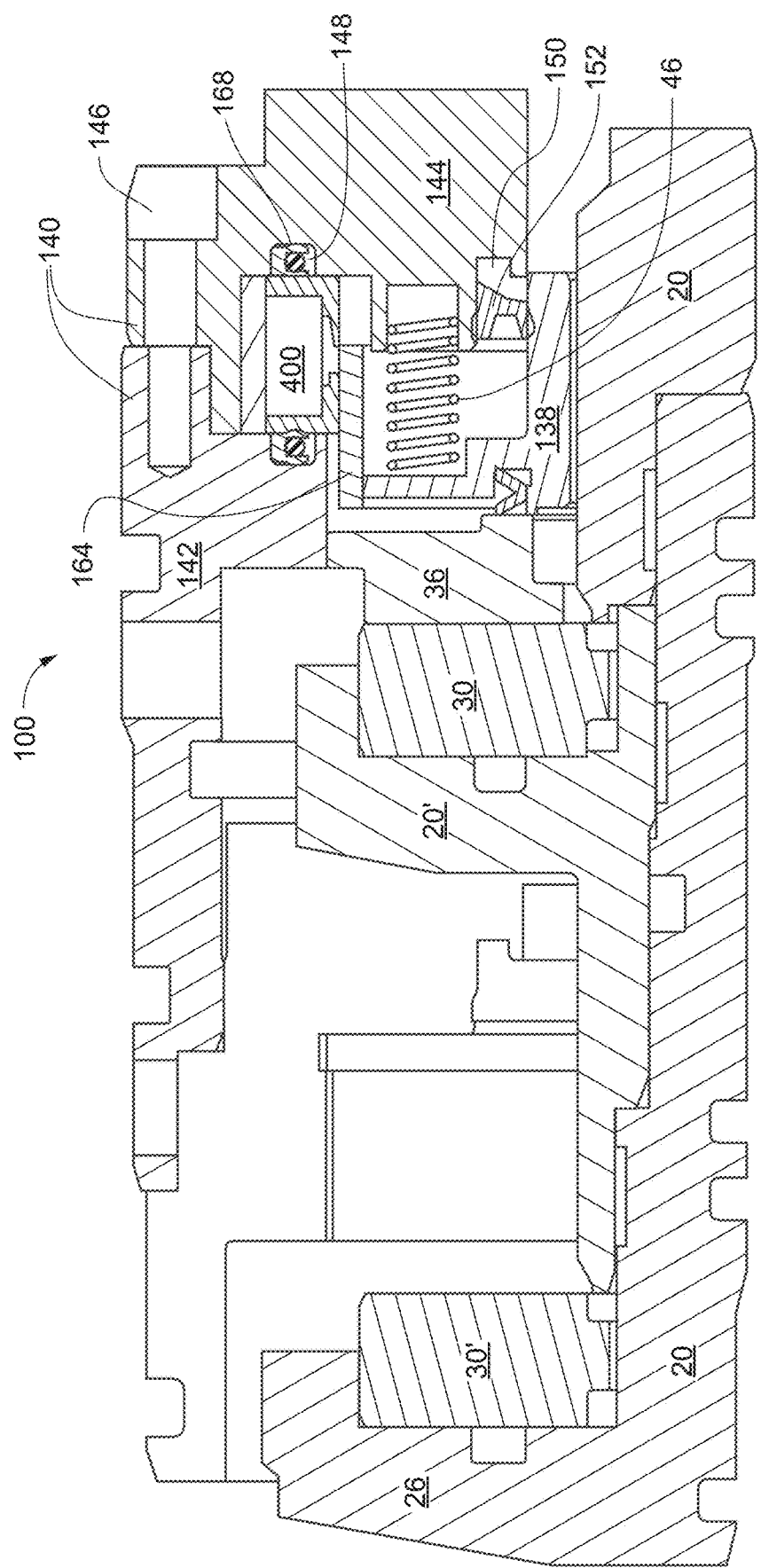
FIG. 2A is a sectional view depicting a mechanical seal assembly, according to an embodiment.

FIG. 2A depicts a cross-sectional view of an mechanical seal assembly 100 (which can be an active dry gas seal assembly), according to an embodiment. Active seal assembly 100 is depicted as a tandem seal, as illustrated and described with respect to FIG. 1 above, however various components of the inboard seal interface are not shown for clarity. Active seal assembly 100 therefore depicts an outboard seal interface defined by mating ring 30 and primary ring 36 including an electromagnetically controllable carrier 138.

In embodiments, electromagnetically controllable carrier 138 (and related components) can be deployed at both an inboard and output seal interface of a tandem seal assembly. Other embodiments comprise tandem seal assemblies (or other seal assemblies with multiple seal stages) including electromagnetically controllable carrier 138 (and related components) only at an outboard seal interface. Such embodiments can be desirable where, for example, issues such as excess spring load in slow roll conditions and hang-up are, at least in part, mitigated by the proximity of the inboard seal interface to the process chamber and the lubricating fluid inlet. Other configurations are also possible.

As depicted in FIGS. 2A-F, active seal assembly 100 comprises rotating mating ring 30, non-rotating, axially-translating, primary (or "face") ring 36, and compression springs 46. These can be the same or similar to those described with respect to FIG. 1 above, or can have different configurations for mechanical components known in the art based on the specific needs of various embodiments.

As described above a plurality of radially spaced compression springs 46 act as a biasing mechanism between annular retainer 140 and carrier 138, to urge primary ring 36 axially inboard toward mating ring 30. While compression springs 46 are depicted here, other biasing mechanisms known in the art such as bellows can be provided to urge carrier 138 and primary ring 36 inboard.

Figure 2B:
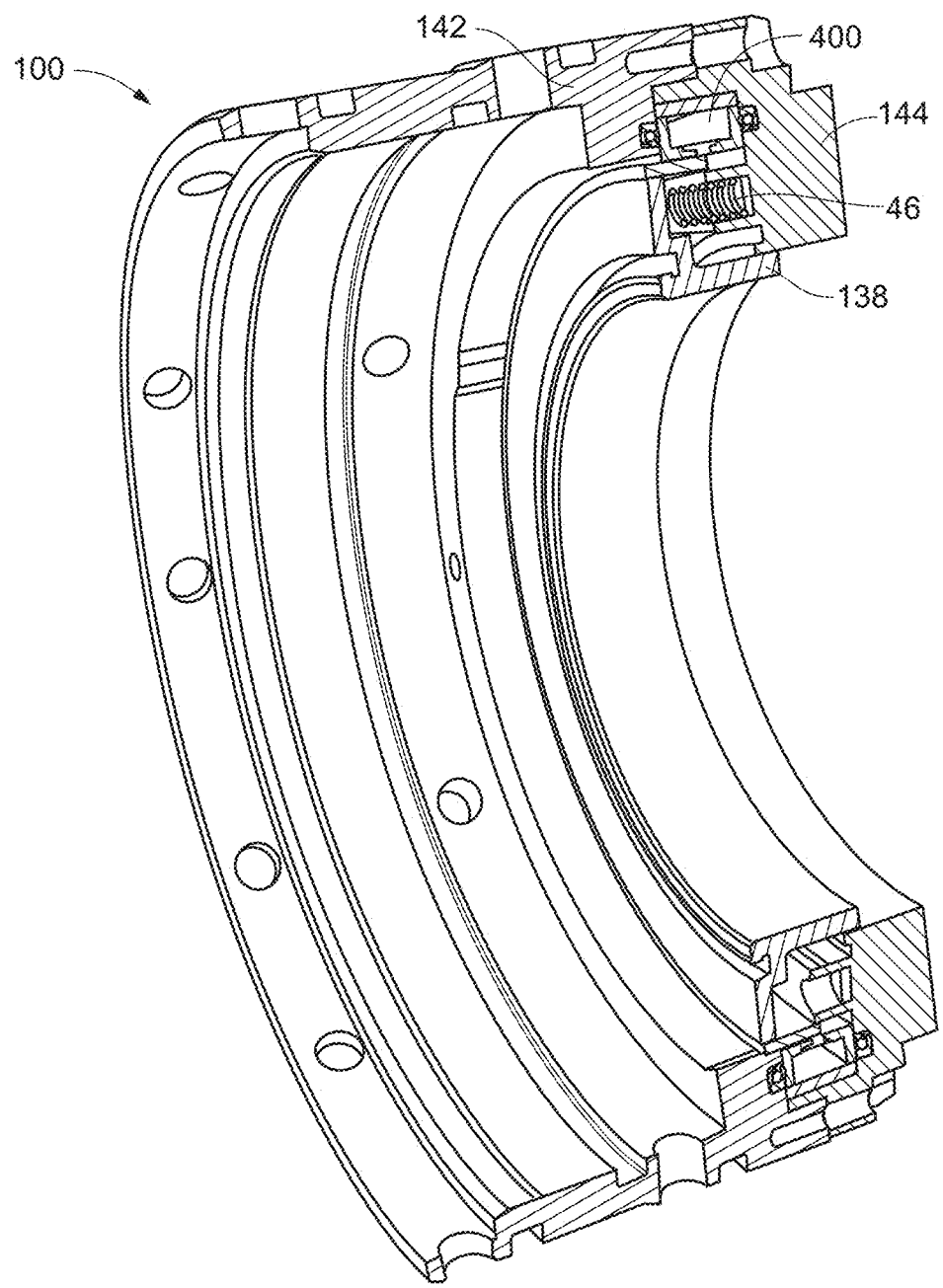
FIG. 2B is a perspective, sectional view depicting a mechanical seal assembly, according to an embodiment.
Figure 2C:
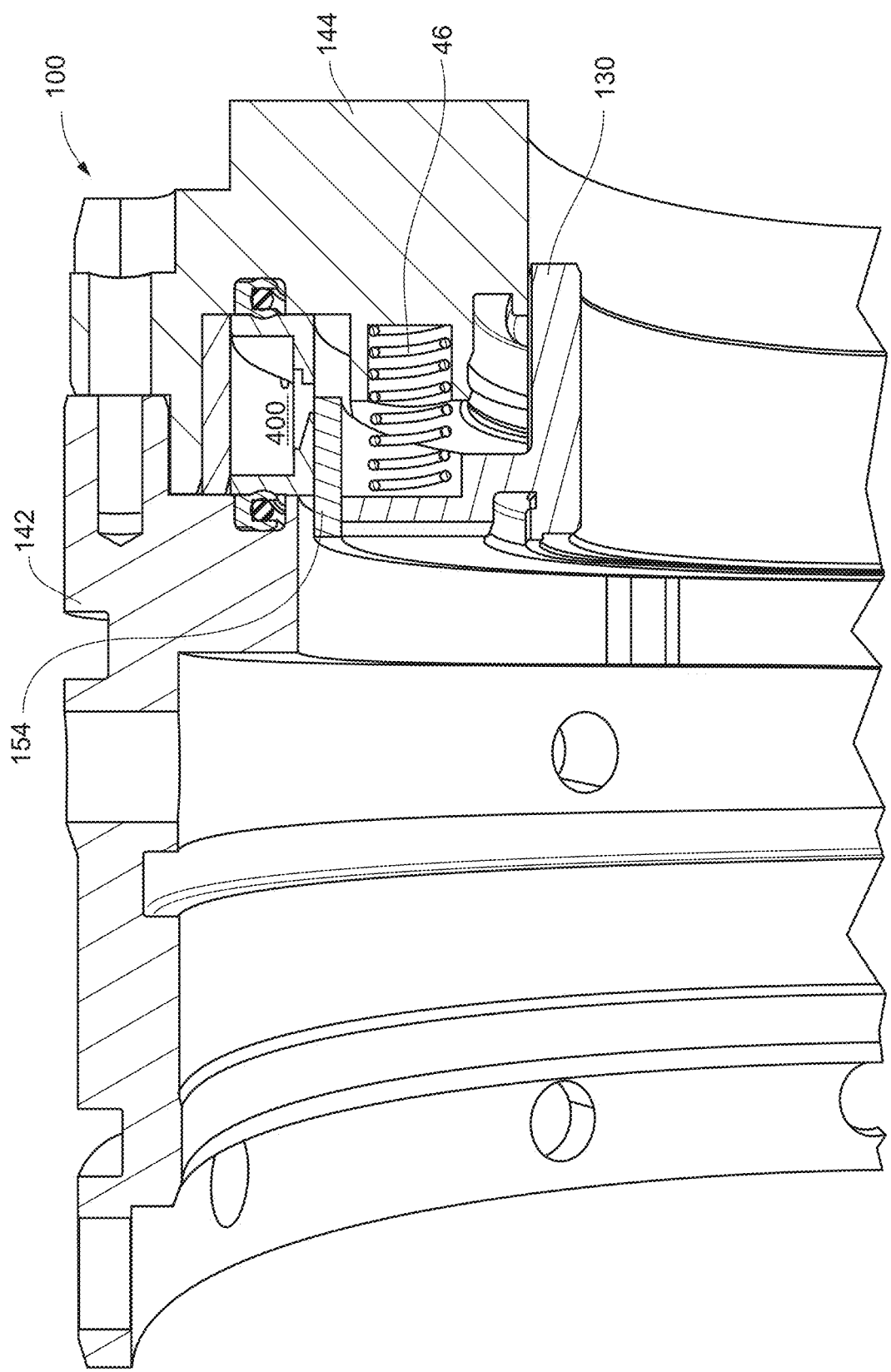
FIG. 2C is a perspective, sectional view depicting a mechanical seal assembly, according to an embodiment.
Figure 2D:
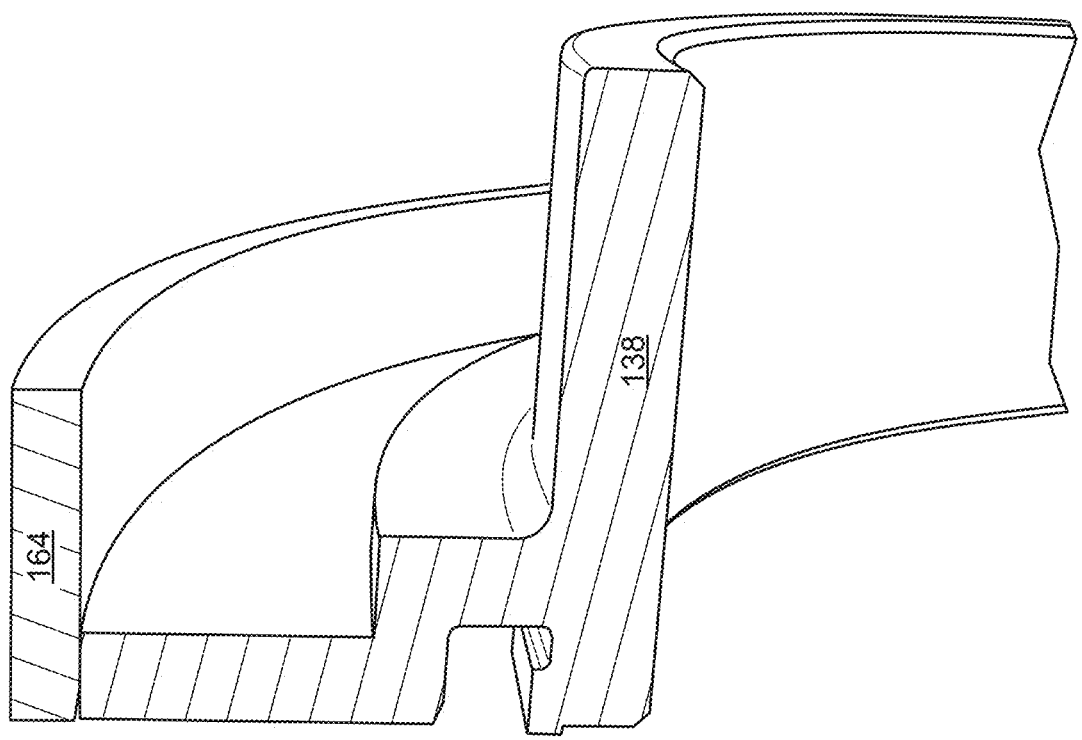
FIG. 2D is a perspective, sectional view depicting a carrier and magnetic ring, according to an embodiment.
Figure 2E:
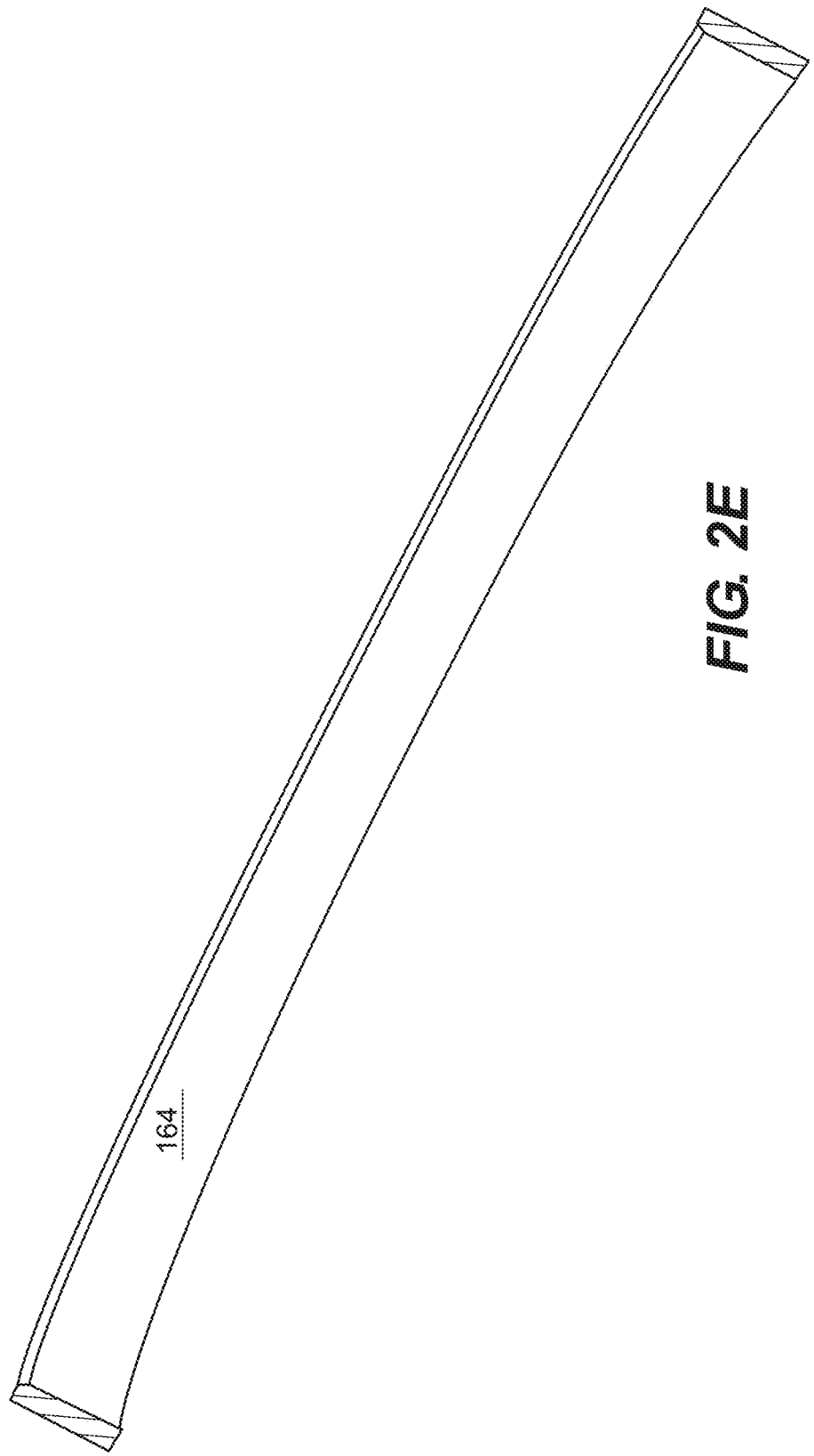
FIG. 2E is a perspective, sectional view depicting a magnetic ring, according to an embodiment.
Figure 2F:
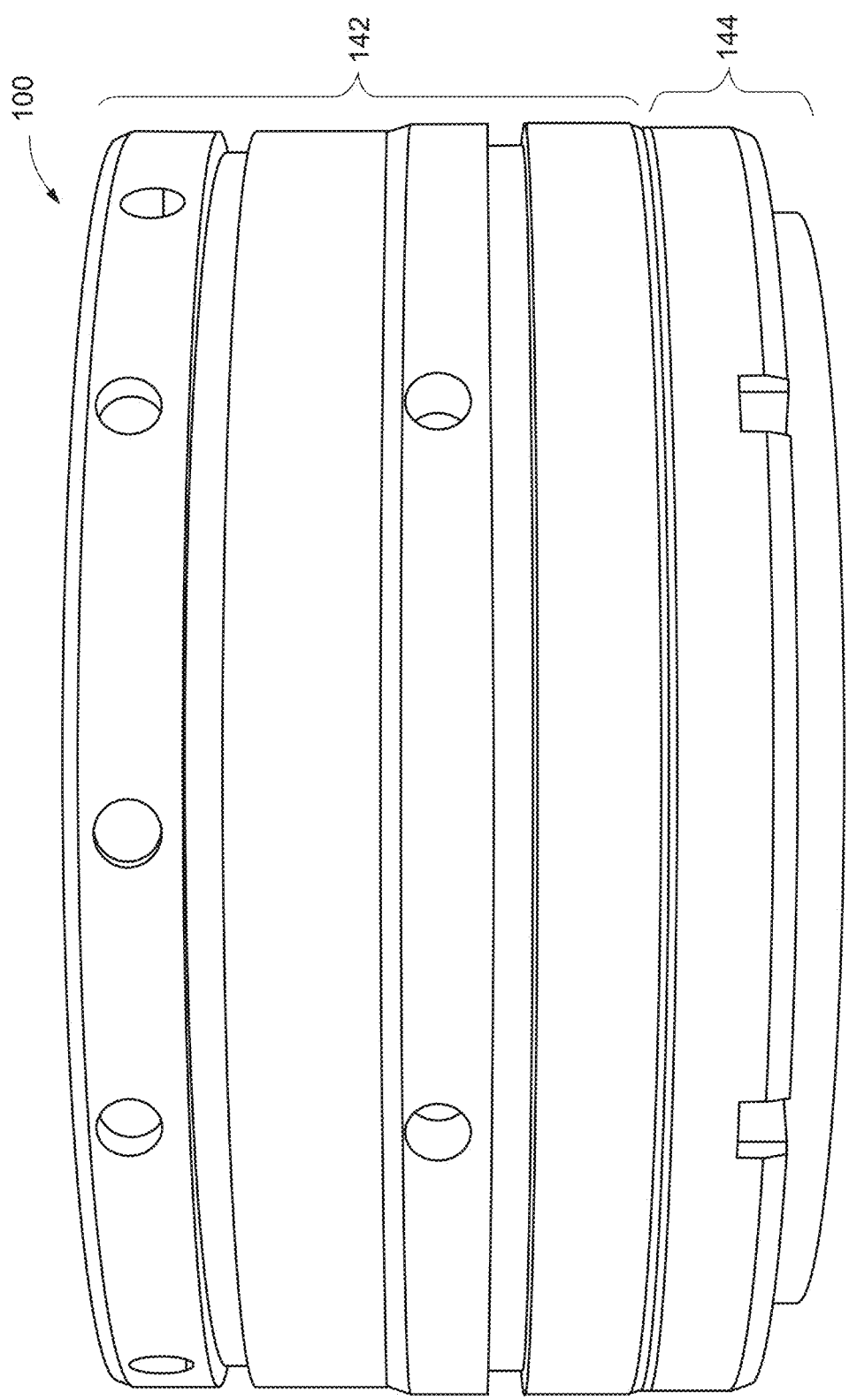
FIG. 2F is a perspective view depicting the exterior of a mechanical seal assembly, according to an embodiment.

As can be seen more clearly in the detail views of FIGS. 2C-2E, magnetic ring 164 can be arranged at an outer diameter of carrier 138. In embodiments, magnetic ring 164 can comprise a portion of carrier 138, such that carrier 138 and magnetic ring 164 are a single unit. In other embodiments, however, magnetic ring 164 can be fixably attached to carrier 138, for example by an interference, press, or friction fit, or attached through some other attachment mechanism (such as fasteners or adhesives). In embodiments, it is advantageous to press fit magnetic ring 164 to carrier 138 so that carrier 138 can be comprised of a non-magnetic material, and so that magnetic ring 164 can be attached to other embodiments of carrier rings, such as carrier ring 38 as depicted in FIG. 1, with minimal redesign or retrofit requirements.

At least an outboard portion of magnetic ring 164 is comprised of a magnetic material. In embodiments, all of magnetic ring 164 can be comprised of a magnetic material.

Figure 5A:
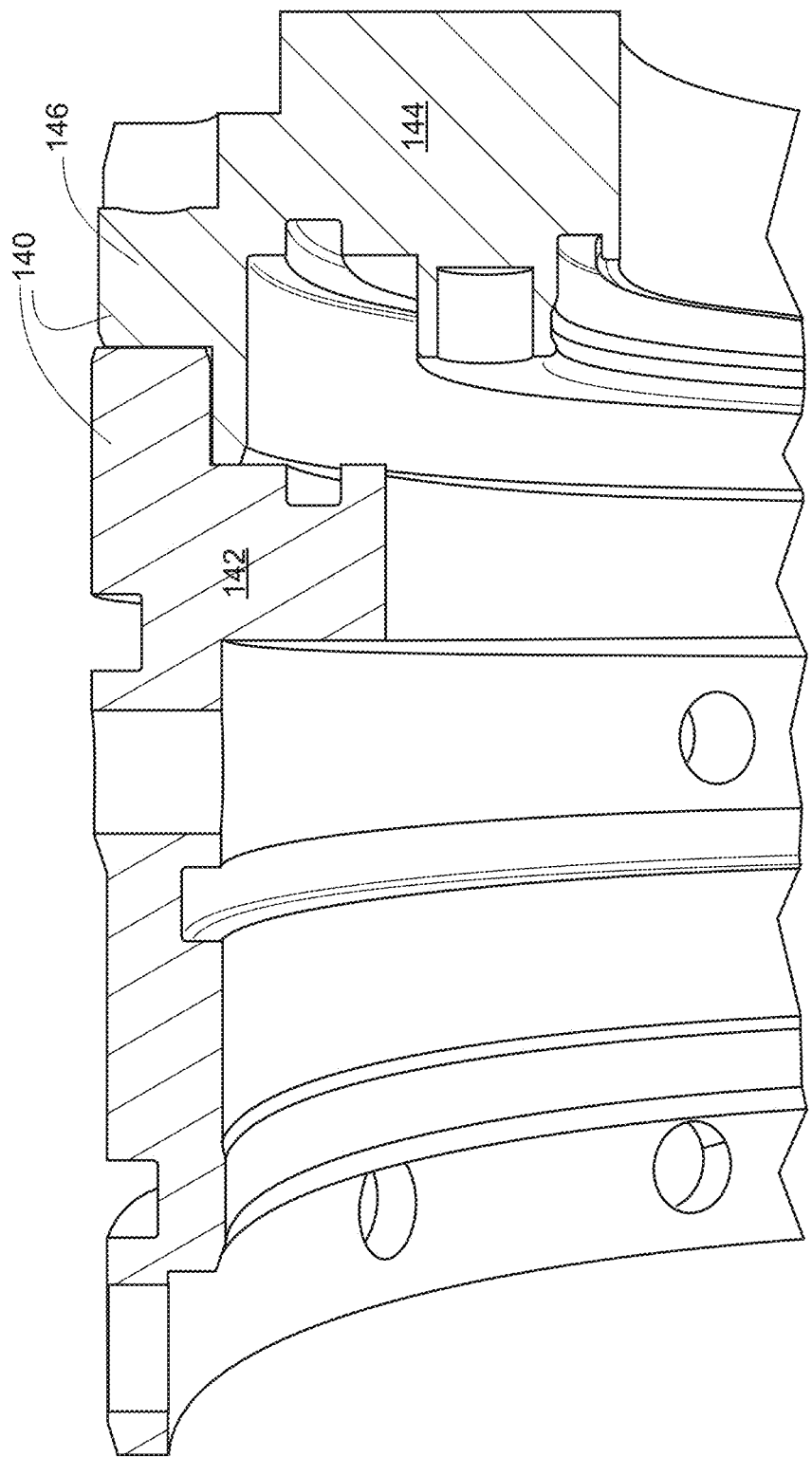
FIG. 5A is a perspective, sectional, view depicting a retainer, according to an embodiment.

In contrast to conventional retainers 40 (as depicted in FIG. 1), retainer 140 can be constructed in multiple parts for ease of assembly in embodiments. Retainer 140 comprises annular inboard portion 142 and annular outboard portion 144. Each of inboard portion 142 and outboard portion 144 respectively defines a portion of a plurality of radially-spaced, axially-extending, set screw bore 106, whereby set screws or other fasteners (not shown) can be used to provide fixation between inboard portion 142 and outboard portion 144. Each of inboard portion 142 and outboard portion 144 further defines at least one annular solenoid seal groove 148 into which annular solenoid sealing elements 168 can be arranged. Additional detail views of retainer 140 are provided in FIGS. 5A-5C.

Inboard portion 142 further comprises annular retainer seal groove 150 into which annular retainer sealing element 152 can be arranged. Solenoid sealing elements 168 and retainer sealing element 152 can present cross-sections that are primarily v-shaped, u-shaped, or can comprise solid o-rings, or take any other configuration suitable for providing sealing engagement. Solenoid sealing elements 168 and retainer sealing element 152 can comprise rubber, silicone, or other polymers, or other suitably resilient material.

Components of seal assembly 100 such as retainer 140 and carrier 138 are advantageously made from non-magnetic stainless steel (or other non-magnetic material) to avoid or minimize the magnetization of the rotor and generation of induction current while rotating and also to inhibit magnetic ring 164 from being inappropriately magnetically attracted to the non-magnetic components.

Solenoid 400 can be received within retainer 140. FIG. 3A depicts a cross-sectional view of an embodiment of a solenoid 400. Solenoid 400 comprises coil 402 comprising a plurality of windings of an electrically conductive and insulated wire, such as a copper-cored or aluminum-cored magnet wire. In embodiments, the wire can be coated with one or more insulating compounds such as polyester, epoxy, polyesterimide, polyvinyl, polyurethane, polyamide imide, poly phenyl sulfone and the like, including tris(2-hydroxyethyl) isocyanurate (THEIC) modified compounds. In embodiments, a first compound can be enameled to the metal core and an additional overcoat or varnish of polyamide imide, Dacron, silicone or the like can be added.

In embodiments, coil 402 can comprise between about one-hundred and two-hundred turns of a wire having a diameter of between about 0.25 mm and 0.75 mm. The diameter and number of coils can be chosen based on the parameters such as the desired magnetic force and maximum current applied. As assembled, coil 402 is arranged within an annular casing 404. Casing 404 can comprise a bobbin 406 and an outer portion 408. Unlike conventional solenoid bobbins and casings, casing 404 provides part of the magnetic circuit to produce an actuation force.

Bobbin 406 can comprise a non-magnetic spacer 410 at a portion of a radially inward facing side. In embodiments, spacer 410 can present a cross-sectional shape configured to force the magnetic material to saturate progressively when the current is increased and the plunger is moving. Spacer 410 can comprise a generally triangular portion 412 that is elongated in the intended direction of the actuation force. For example, the solenoid 400 depicted in FIG. 2A is arranged to provide an outboard directed actuation force to urge magnetic ring 164 (and therefore carrier 138) axially outboard in opposition to the spring force provide by springs 46. As can be seen in FIGS. 2B and 2C, however, solenoid 400 can be arranged such that triangular portion 412 is elongated in a different direction. The configuration of spacer 410 allows for tuning of the strength of the actuation force as the plunger position changes.

In embodiments, bobbin 406 can be constructed in three pieces. Spacer 410 can comprise non-magnetic stainless steel or other non-magnetic materials. Generally L-shaped in cross-section, side portions 414 and 416 are magnetic and can be configured to receive spacer 410 such that the radially inward face of spacer 410 presents a portion of casing 404. The components of bobbin 406 can be affixed via a method capable of withstanding expected forces within seal assembly 100 (for example, pressures up to about 300 bar), such as laser seam welding or other methods.

Coil 402 can be wound onto bobbin 406 via methods known in the art for winding of conventional solenoid coils. Outer portion 408 can comprise a magnetic material and can be affixed to side portions 414 and 416 to encase coil 402.

Solenoid 400 can comprise an electrical connection 420. In embodiments, electrical connection 420 can comprise electrical wires, though wireless power transmission methods such as induction can be used in embodiments. In embodiments, electrical connection 420 can terminate at a controller 502 (see FIG. 6) configured to energize solenoid 400 as needed to provide actuation force. In embodiments, controller 502 can be in data communication with a rotational speed sensor or modulator.

Figure 3E:
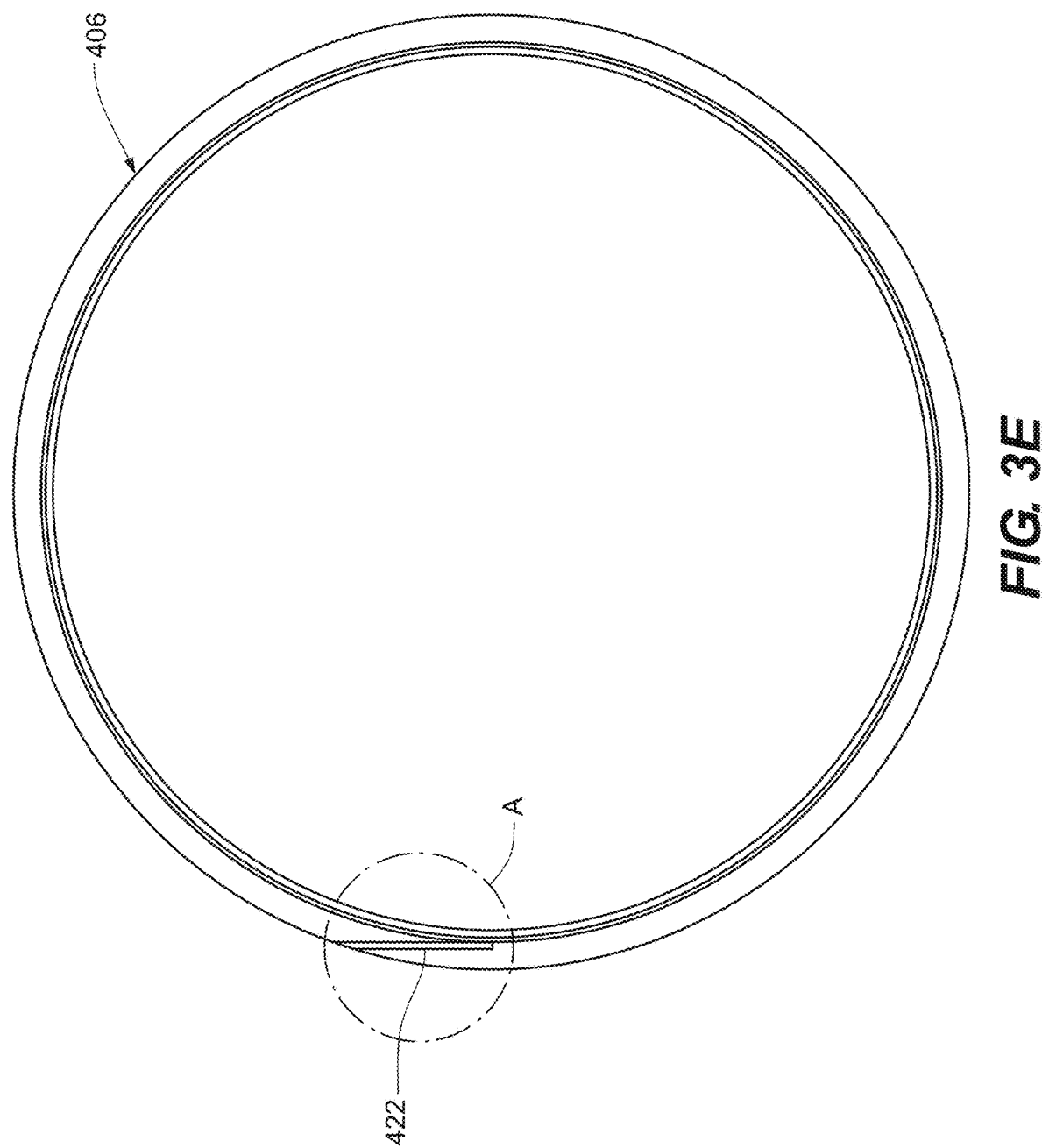
FIG. 3E is a plan view depicting a solenoid, according to an embodiment.
Figure 3F:
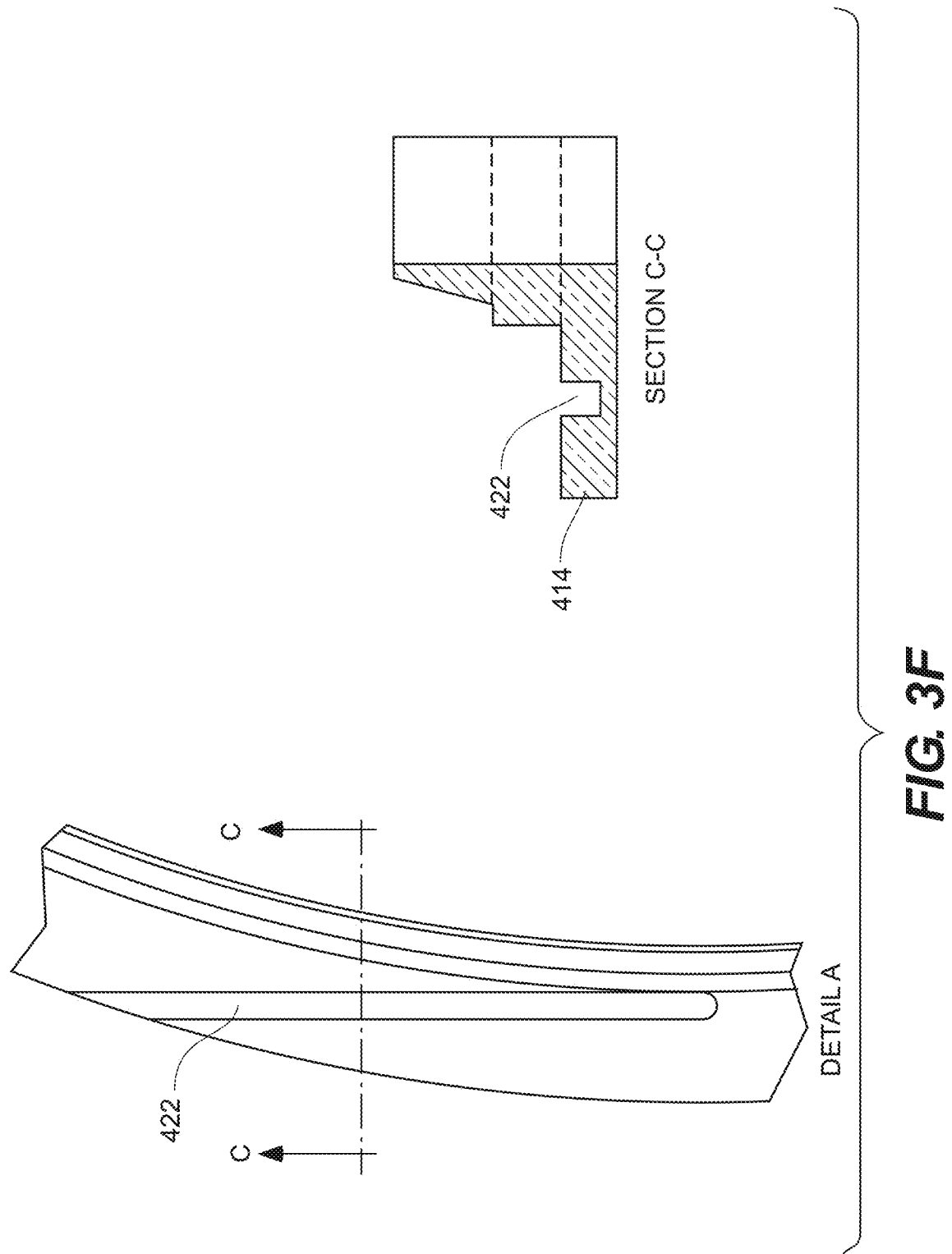
FIG. 3F is a detail and section view depicting a solenoid, according to an embodiment.

FIGS. 3B-3D are plan, sectional, and detail views of bobbin 406, according to an embodiment. FIGS. 3E-3F are plan, detail, and sectional views of an embodiment of bobbin 406 in which a wire conduit 422 through which electrical connection 420 can pass is more clearly visible.

Figure 4:
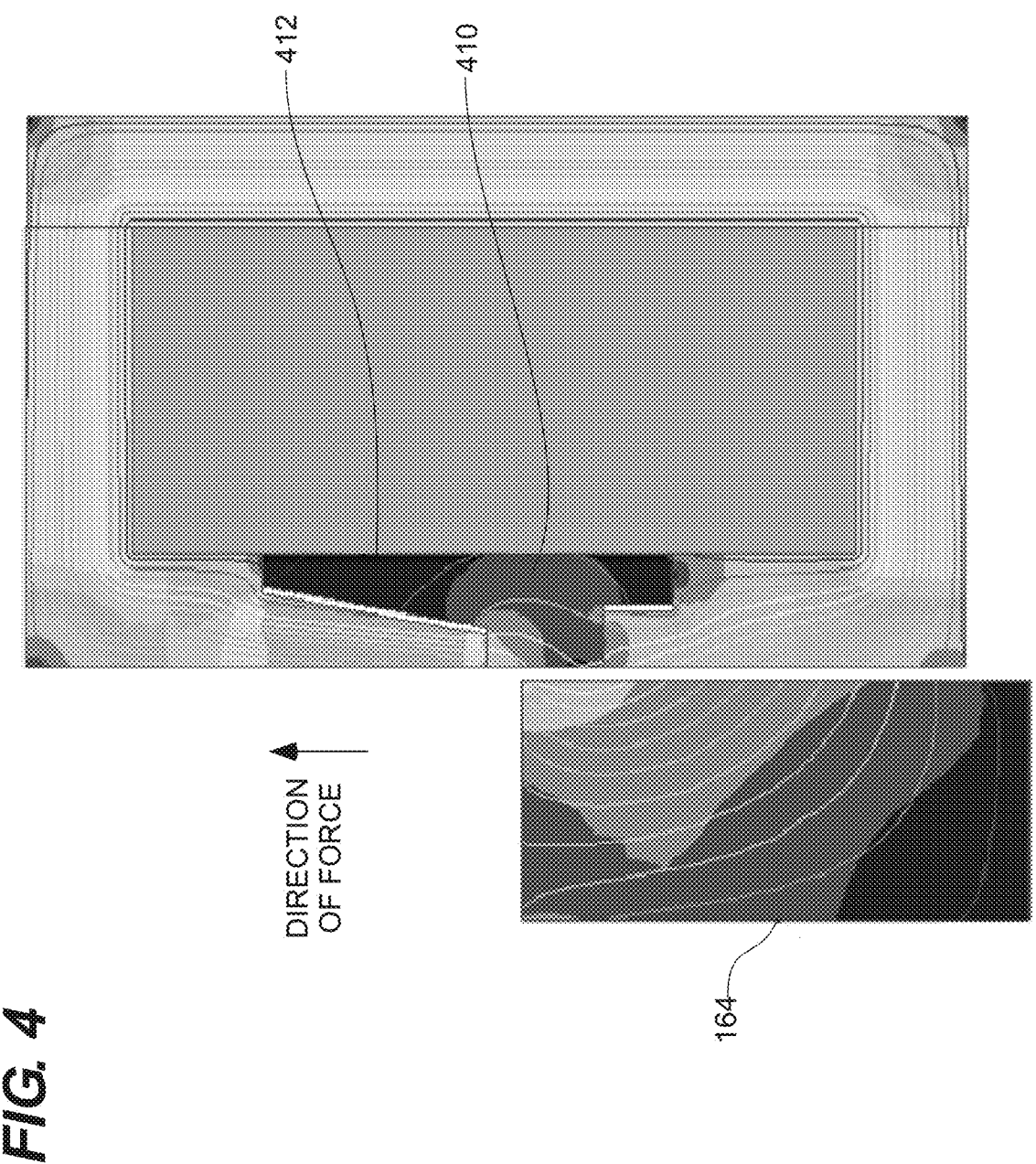
FIG. 4 is a section view depicting magnetic flux, according to an embodiment.

FIG. 4 schematically depicts the magnetic flux density across a cross section of solenoid 400 and a portion of magnetic ring 164 in which areas of higher magnetic flux density are generally depicted in darker shades. The magnetic field generated by energizing solenoid 400 can provide an axial actuation force to ferromagnetic materials arranged within the inner diameter of solenoid 400. The axial actuation force can be generally parallel to the shaft 12, and therefore urge magnetic ring 164 or other ferromagnetic components axially. The magnetic field is generally consistent around the circumference of solenoid 400.

In other embodiments, solenoid 400 can be replaced with one or more other components suitable to convert electric current to a magnetic field capable of urging magnetic ring 164 (and therefore carrier 138) axially inboard or outboard. While annular solenoids comprising non-ferromagnetic bobbins and casings can be used, solenoid 400 as described above can provide a greater axial actuation force for a given cross-section area, decreasing the space requirements of seal assembly 100. While a plurality of individual electromagnets can be controlled to apply an actuation force to the carrier, solenoid 400 requires only a single electrical connection point. The uniform actuation force applied around the diameter of the magnetic ring 164 further enables well-controlled, small adjustments in the force applied, enabling embodiments to effectuate minute changes in carrier position, and/or friction between the seal faces. Solenoid 400 can therefore be a magnetic actuator, providing actuation force to carrier 138 via magnetic ring 164.

Figure 6:
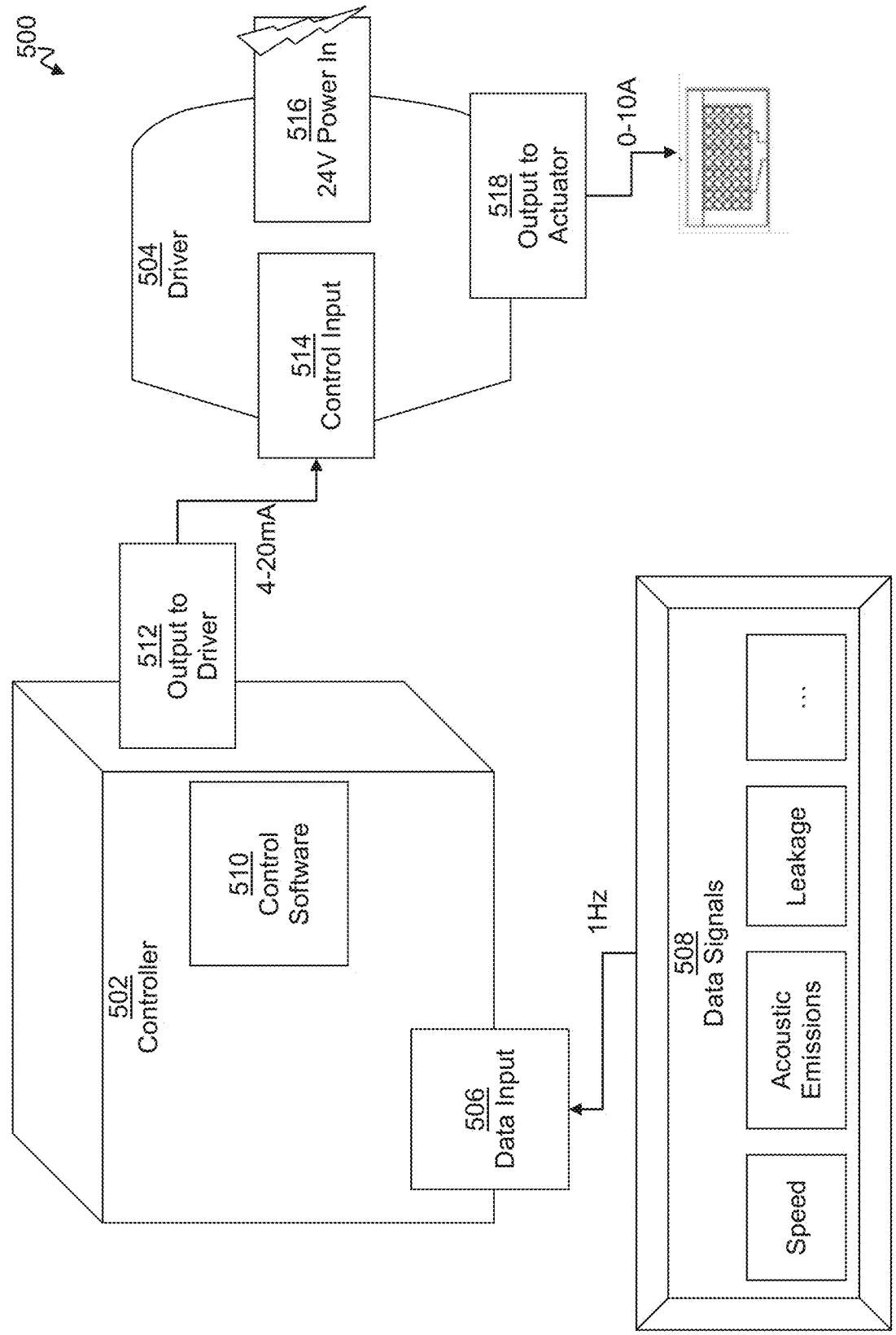
FIG. 6 is a schematic diagram depicting a control system, according to an embodiment.

In embodiments, solenoid 400 can be operably coupled to a control system (or other device) configured to energize solenoid 400 or other actuator(s) (when desired) to modulate a force urging carrier 138 to move axially. FIG. 6 is a schematic view of one embodiment of a closed loop control system 500. Those of ordinary skill in the art will appreciate that control system 500 is just one embodiment of a system suitable to control solenoid 400, and that other control systems, including those in data communication with one or more diagnostics or prognostics systems, can be used.

Control system 500 comprises controller 502, and driver 504. In one embodiment, controller 502 can comprise a single-board computer such as a RASPBERRY PI computer (Raspberry Pi is a trademark of the Raspberry Pi Foundation). Controller 502 can comprise data input interface 506, configured to receive a plurality of data signals 508. Data input interface 506 can comprise an Ethernet connection, though any other wired or wireless data communication method can be used by embodiments.

Data signals 508 can include any sensor signals or parameter data, such as shaft rotation speed, acoustic emissions data, or leakage data. In embodiments, the sources of data signals 508 can include one or more sensors (not shown) located in or around seal assembly 100. Sources of data signals 508 can further include sensors associated with the seal assembly, the rotating machine, or the ambient environment. In embodiments, data signals can be provided by a prognostics and diagnostics system (not shown) in data communication with controller 502.

Any sensor inputs known in the art can be provided. Examples of such sensor inputs include a tachometer or other speed sensor to provide the current rotational speed of the shaft. A proximity or gap sensor such as those known in the art can provide data related to the size of the current gap (or current width) between primary ring 36 and mating ring 30. A flowmeter can provide an indication of leakage from the seal interface. A temperature sensor (or thermometer) can be provided to detect a temperature at or near primary ring 36 and mating ring 30, from which heat generated by friction can be detected.

In one example embodiment, acoustic emissions can be used to detect whether primary ring 36 and mating ring 30 are in frictional contact and/or the degree of that contact. Acoustic sensors can detect properties (such as amplitude in decibels and/or frequency) of noise being emitted at the seal interface. Loud noises, or noises at certain pitches can indicate frictional contact. Quieter noises can indicate a degree of separation between the seal rings. Each acoustic sensor can comprise a microphone and/or a structural vibration detector.

Data signals 508 can be encoded in an OLE (Object Linking and Embedding) for Process Controller (OPC) compliant format. Data signals 508 can be received by controller 502 at about 1 Hz from an OPC server, or other data source. Control software 510 can include one or more modules or engines configured to determine an appropriate output to driver 504 based on control algorithms such as those described with respect to FIGS. 7-9 below. Control software 510 can be implemented as a proportional-integral-derivative (PID) control loop, and can be written in the Python programming language.

Output interface 512 can be electrically coupled to input interface 514 of driver 504. In one embodiment, the output from output interface 512 can comprise a 4-20 mA control signal. In one embodiment, driver 504 can comprise a 10 A 5-25 V Dual Channel DC Motor driver (though other driver configurations, including single channel configurations can be used). Driver 504 can receive a 24 V DC power input, and provide a 0-10 A actuation signal to solenoid 400 via output interface 518.

In operation, when shaft 12 is rotating, sleeve 20 and mating ring 30 also rotate relative to housing 18 and primary ring 36. When shaft 12 is rotating at a speed above a threshold, the fluid dynamic force of seal gas is sufficient to overcome the spring force of springs 46. Similarly, when shaft 12 is not rotating, it is desirable for primary ring 36 to contact mating ring 30 in order to prevent leakage of seal gas. However, when shaft 12 is rotating at a speed between zero rpm and a threshold speed, solenoid 400 can be energized to urge plunger axially outboard, away from primary ring 36, thereby counteracting the spring force in order to provide an appropriate gap.

In embodiments, solenoid 400 can be energized to provide a variable magnetic force, such that only as much force is provided as needed to achieve desired movement of carrier 138. In embodiments, the force applied to carrier 138 can be ramped in order to enable gradual movement of carrier 138.

In yet other embodiments, the inboard movement of carrier 138 can be enabled by de-energizing the solenoid 400, such that the spring force of springs 46 acts to urge carrier 138 inboard.

Figure 7:
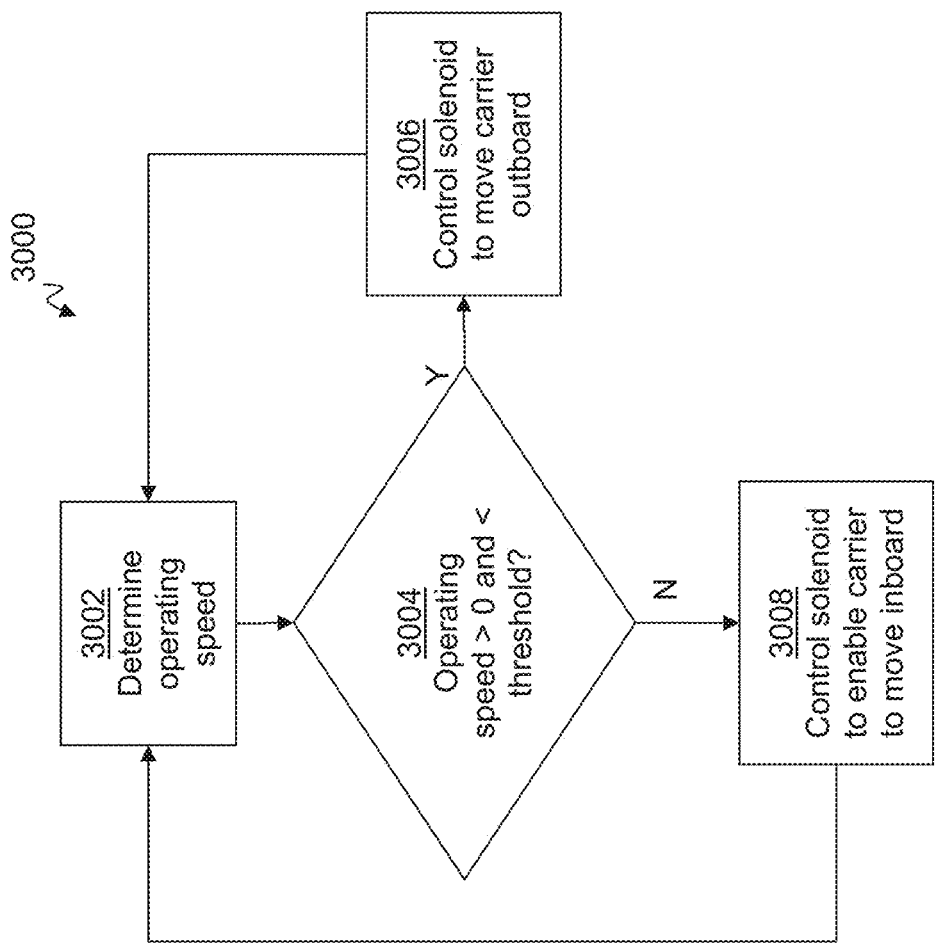
FIG. 7 is a flowchart depicting a method of controlling the axial force on a carrier, according to an embodiment.

FIG. 7 is a flowchart depicting a method 3000 for operation of solenoid 400 based on the rotational speed of shaft 12, according to an embodiment. At 3002, the operating speed of the shaft 12 can be determined. At 3004, if the operating speed is within a slow roll range (between zero and the threshold speed), the solenoid can be energized to urge the carrier 138 outboard, opposing the spring force and increasing the gap between primary ring 36 and mating ring 30 at 3006. Control can then return to 3002. If the shaft 12 is stationary, or is spinning at or above the threshold speed, solenoid 400 can be controlled to enable springs 46 to move carrier 138 inboard at 3008. Control can then return to 3002.

Figure 8:
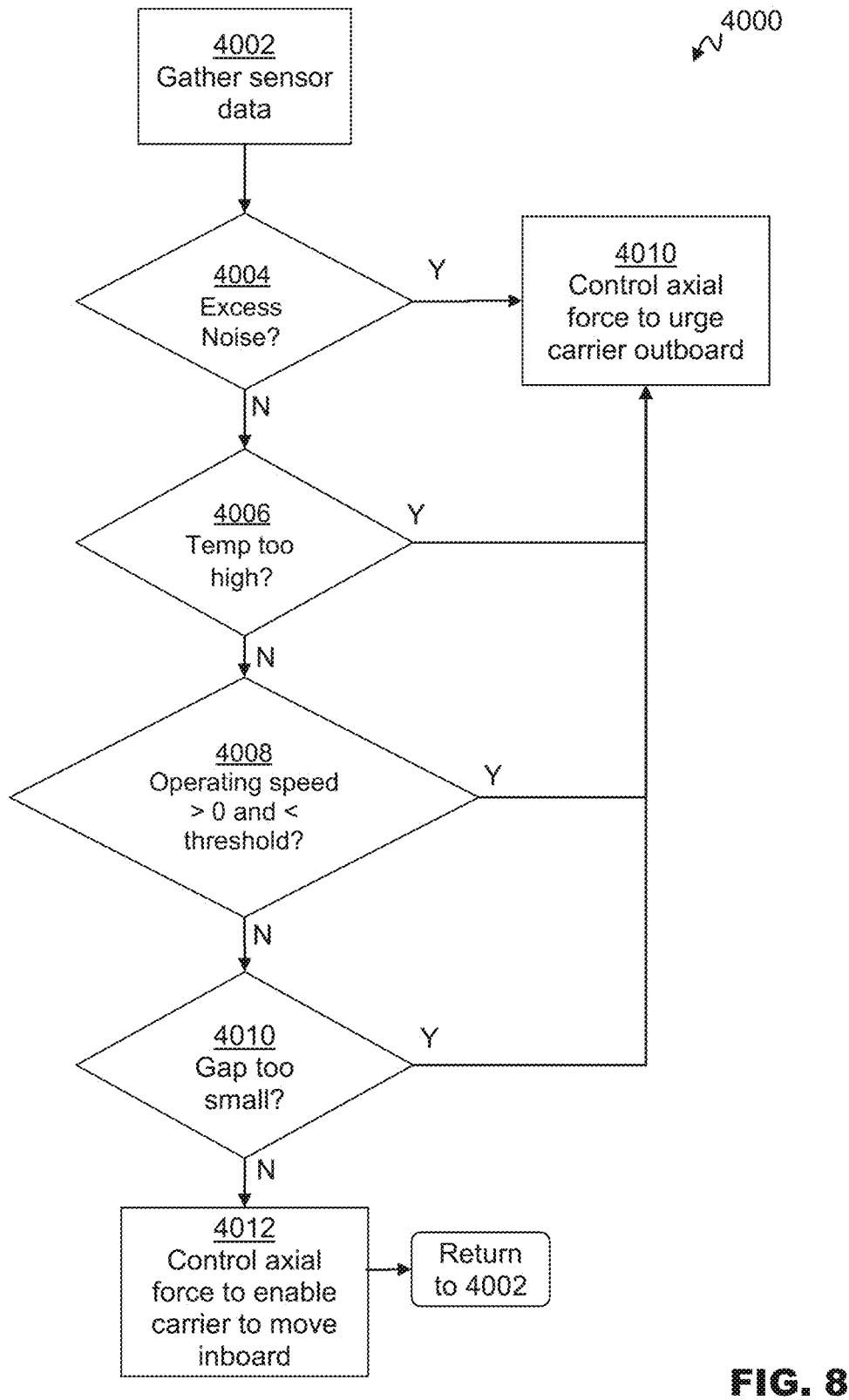
FIG. 8 is a flowchart depicting a method of controlling the axial force on a carrier, according to an embodiment.

FIG. 8 is a flowchart depicting an alternative method 4000 for operation of solenoid 400 based on inputs from a plurality of sensors, according to an embodiment. At 4002, data from one or more sensors can be gathered. At each of 4004, 4006, 4008 and 4010, the sensor data can be analyzed to determine a desired axial force to be applied to carrier 138. If necessary, carrier 138 can be urged outboard by the solenoid at 4010, or the spring force can be allowed to urge carrier 138 inboard at 4012. In embodiments, solenoid 400 can be controlled proportionally based on the inputs from the various sensors. Control can then return to 4002. Each of sensor data analysis tasks 4004, 4006, 4008, 4010 may be dependent on the availability of sensor data. If more, fewer, or alternate sensor data streams are provided, alternate sensor data analysis tasks may be performed by embodiments.

In embodiments, control of solenoid 400 can be based on the result of various sensor fusion algorithms. For example, acoustic emissions data can be disregarded when the rotation speed is known to be zero rpm. In addition, the various thresholds for acoustic emissions can be altered based on the rotation speed, for example, a certain level of noise may be normal at high speed, or a cause for mitigation at a lower running speed.

Figure 9:
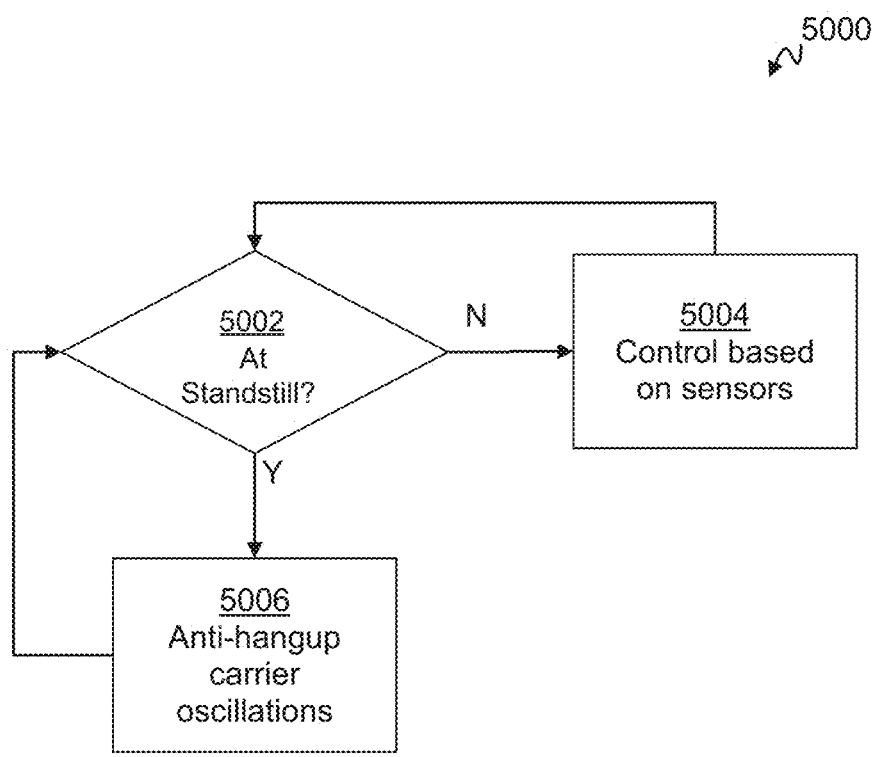
FIG. 9 is a flowchart depicting a method of controlling the axial force on a carrier, according to an embodiment.

FIG. 9 is a flowchart depicting a method 5000 for controlling solenoid 400 to prevent hang-up. At 5002, controller 502 can detect if the seal is operating at a standstill condition (for example 0 rpm). If not, the solenoid can be controlled for steady-state or slow roll operations as described above at 5004. At stand-still however, controller 502 can implement a hang-up mitigation technique at 5006.

Hang-up mitigation can comprise providing high frequency electrical signals (such as through pulse-width modulation) to provide an oscillating axial actuation force to carrier 138. For example, solenoid 400 can be energized at an oscillating frequency of between about 500 Hz-1000 Hz. The oscillating axial force can urge carrier 138 to fluctuate axially outboard and inboard by a distance between about 0.5 mm about 3 mm.

Hang-up mitigation control as described can inhibit the development of hang-up conditions in the seal. The rapid movement of the controller inhibits the deposit or hardening of hydrocarbons on components of seal assembly 100. In addition, heat generated by the impedance of coil 402 to the oscillating current provided can maintain a slightly warmer environment within the seal chamber itself, which can also inhibit hang-up causing deposits.

Figure 10A:
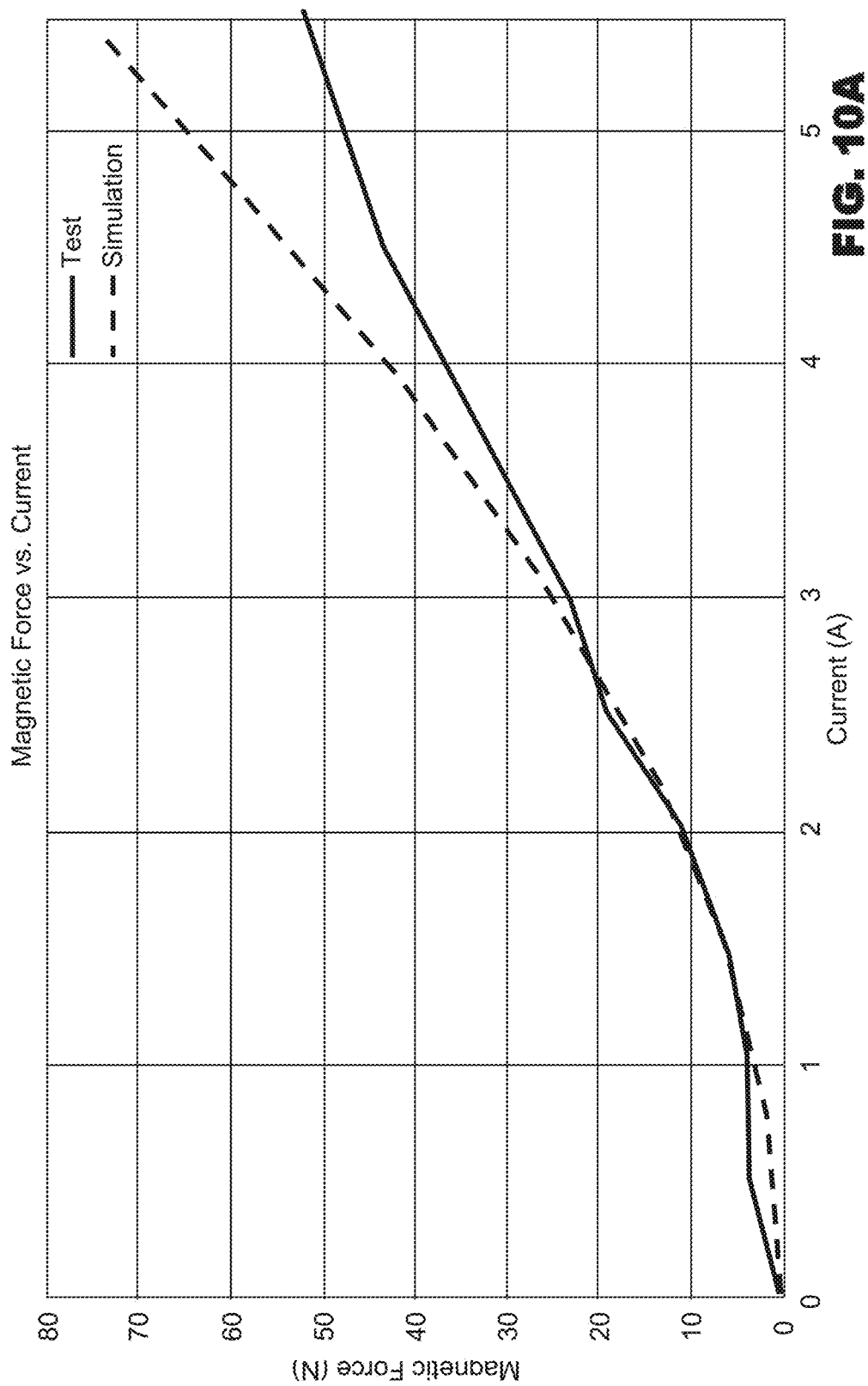
Figure 10B:
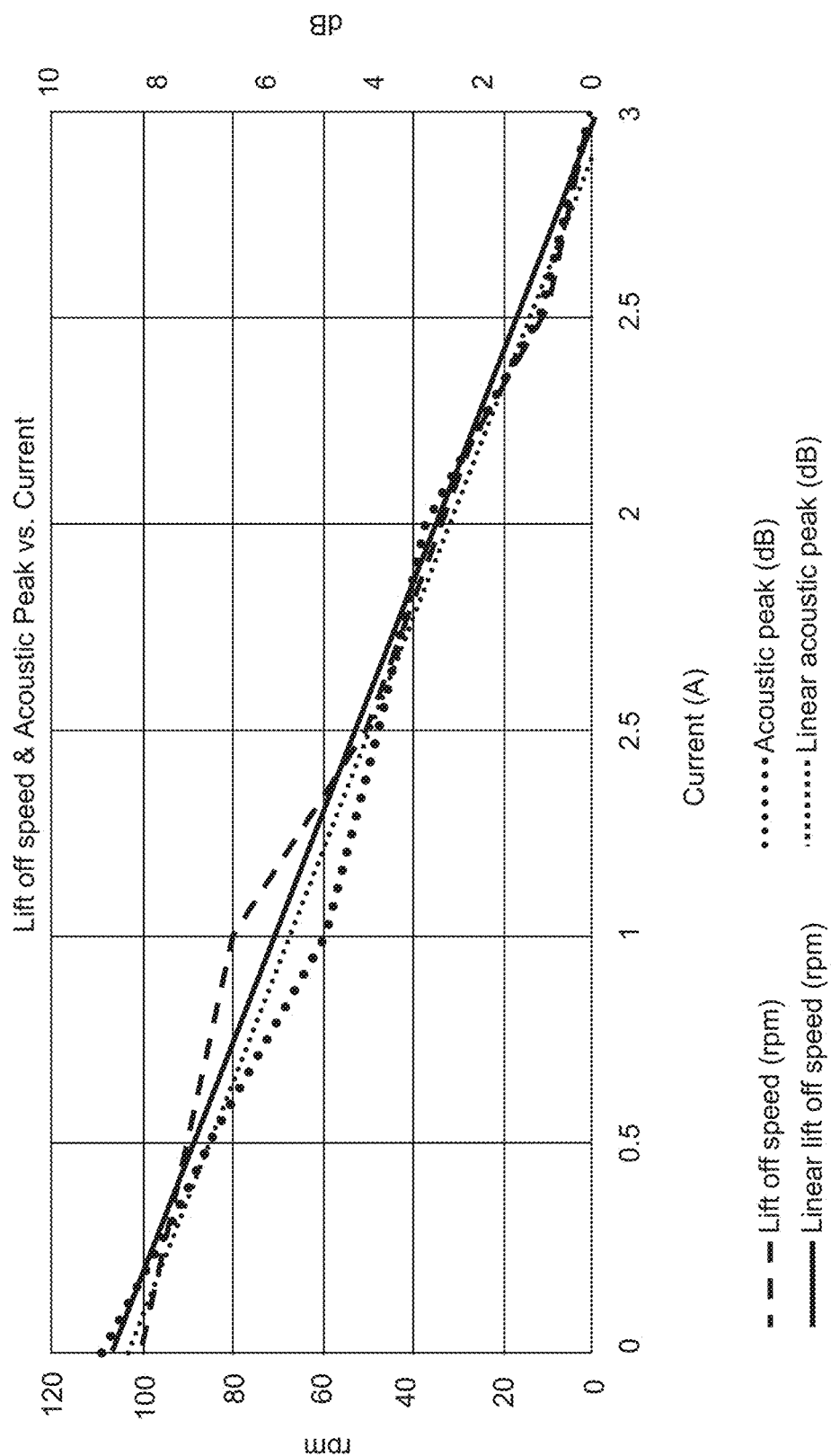
Figure 10C:
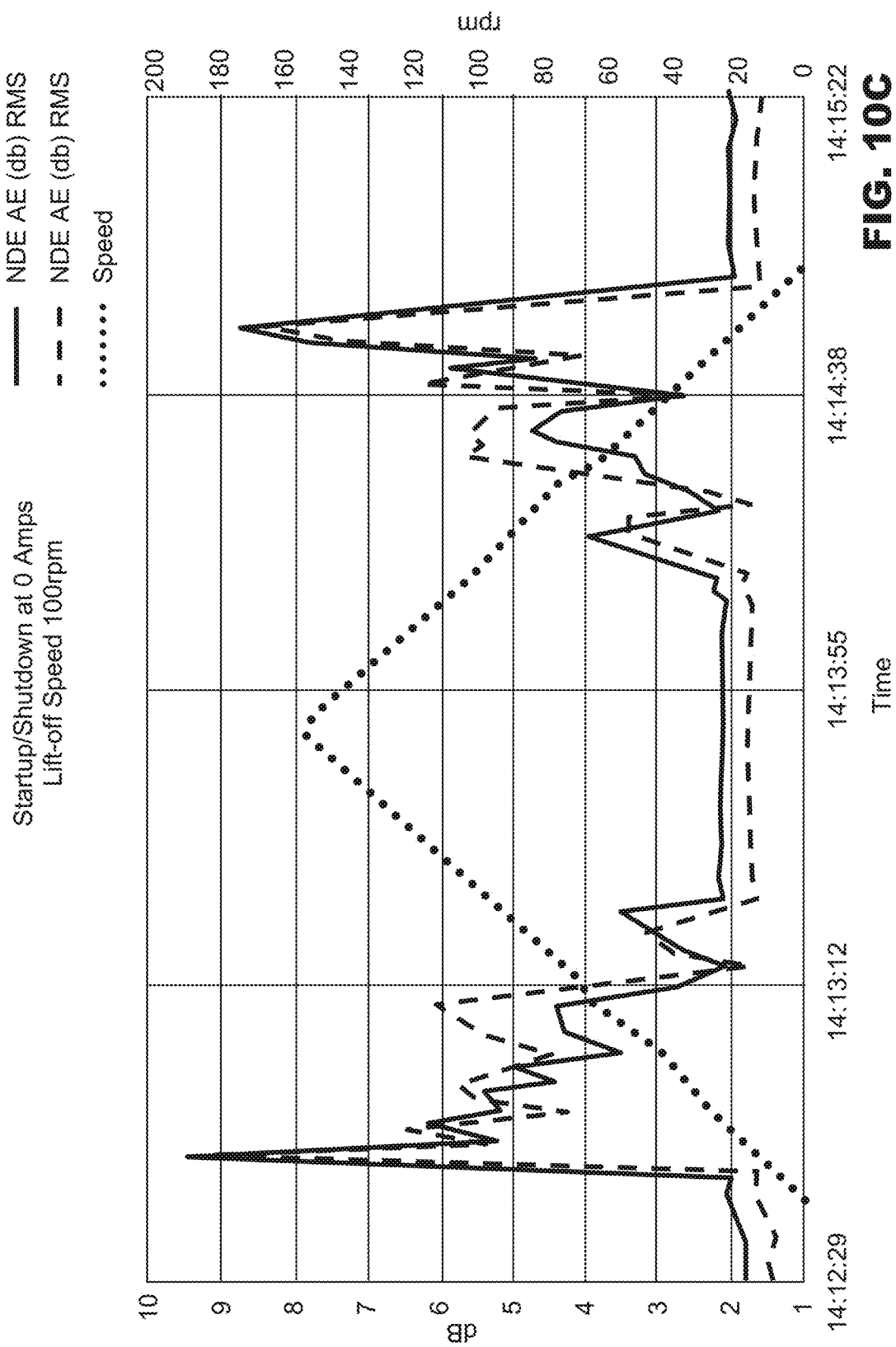
Figure 10D:
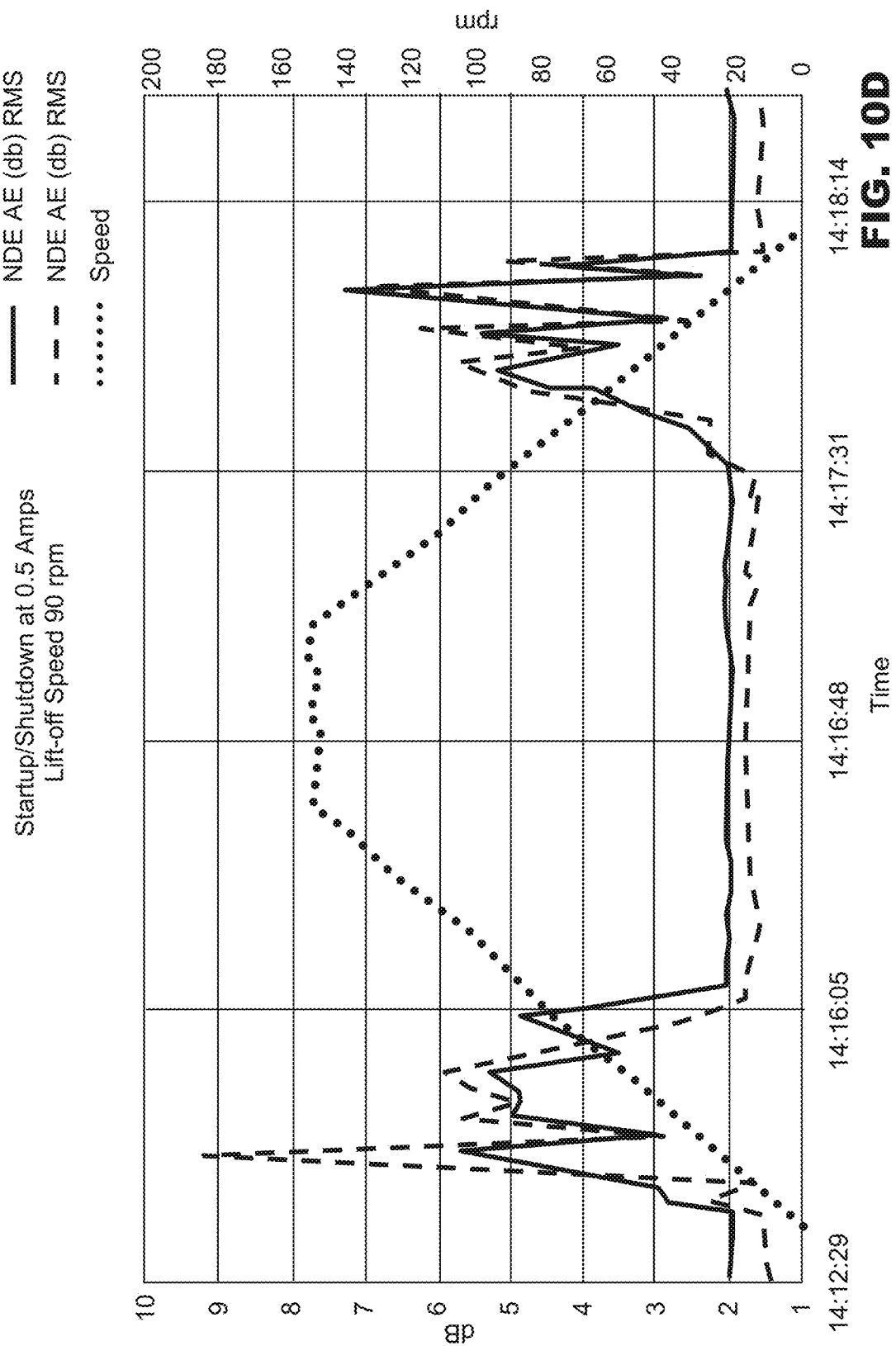
Figure 10E:
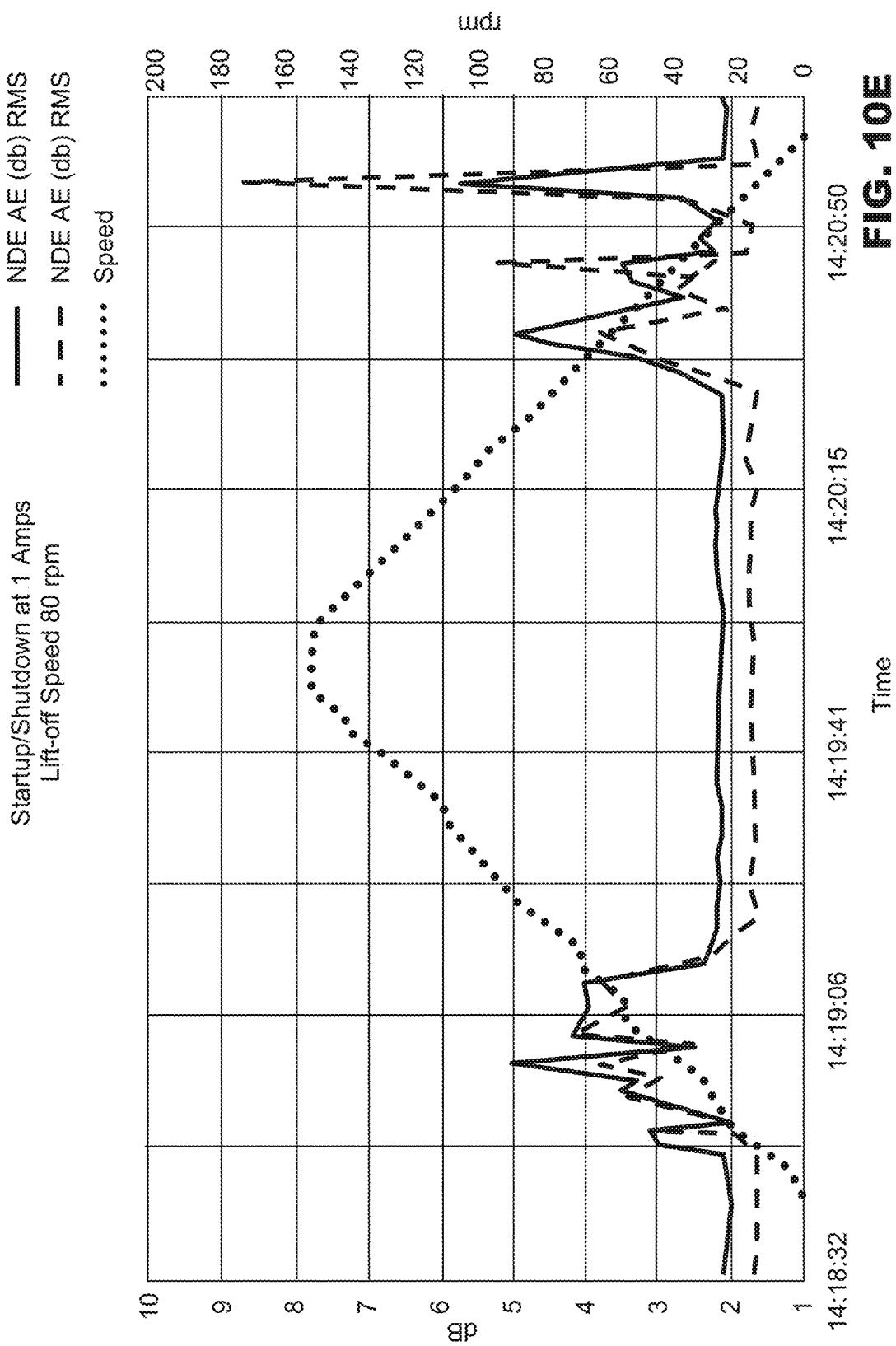
Figure 10F:
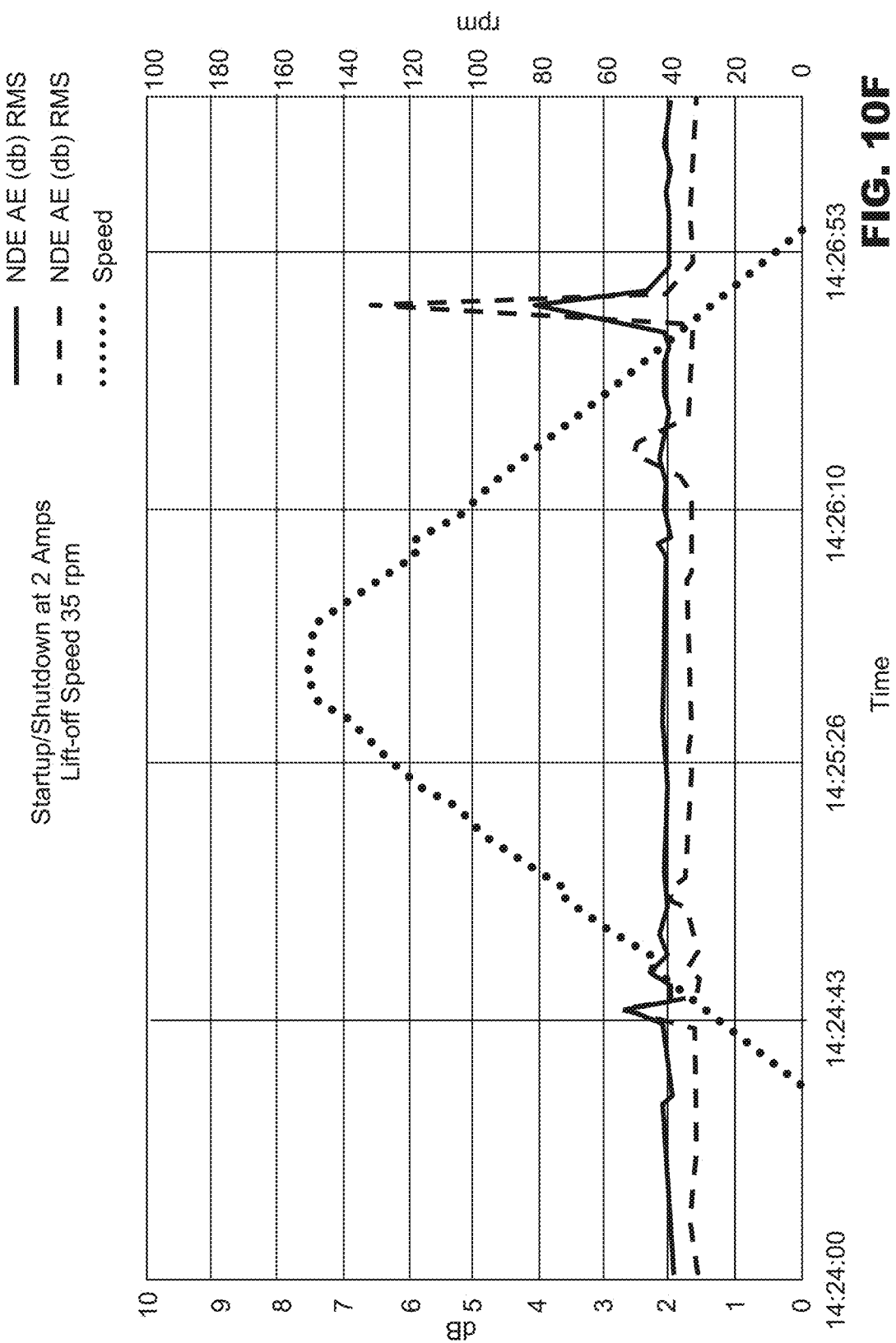

FIGS. 10A-I are a series of charts depicting the results of testing one embodiment of the present disclosure. As can be seen in FIG. 10A, the magnetic force increases with current, both in simulation and testing. As can be seen in FIG. 10B, the spring preload force is completely compensated when the solenoid is energized at 3 amperes, resulting in a lift-off speed of close to 0 rpm. In contrast, when no energy is provided to create a magnetic force, lift-off speed is about 100 rpm. This is also evidenced at least in part by measured acoustic emissions from the seal. As depicted in FIG. 10C, when no current is delivered, the decibel level of the acoustic emissions is quit high below 100 rpm, and quite low above 100 rpm. In FIG. 10D, at 0.5 amperes, the lift-off speed is about 90 rpm (as is the coast-down speed). In FIG. 10E, at 1 ampere, the lift-off speed is about 80 rpm. In FIG. 10F, at 2 amperes, the lift-off speed is about 35 rpm. In FIG. 10G, at 3 amperes, the lift of speed is zero rpm, which can be seen from the lack of any acoustic peak.

Figure 10H:
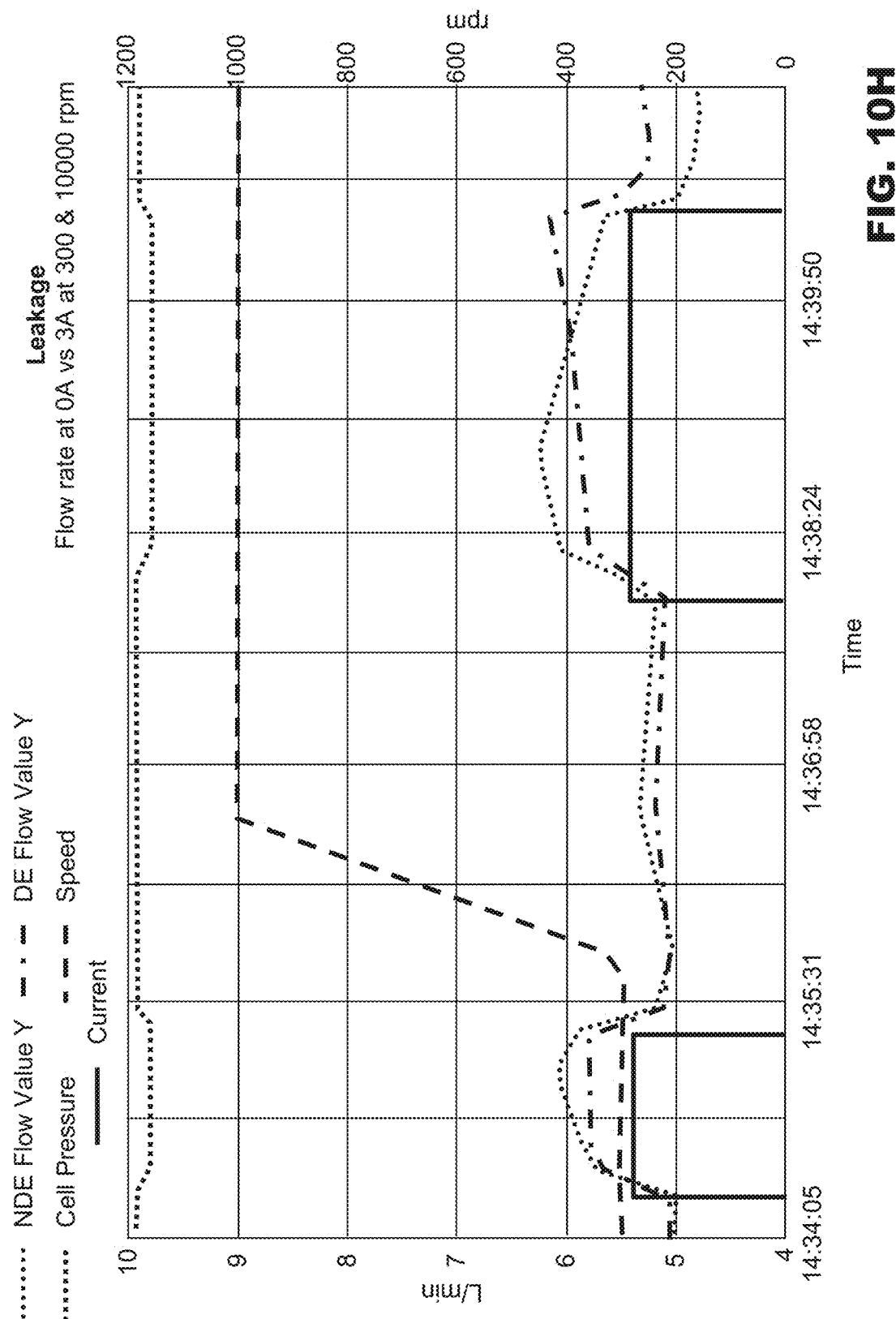
Figure 10I:
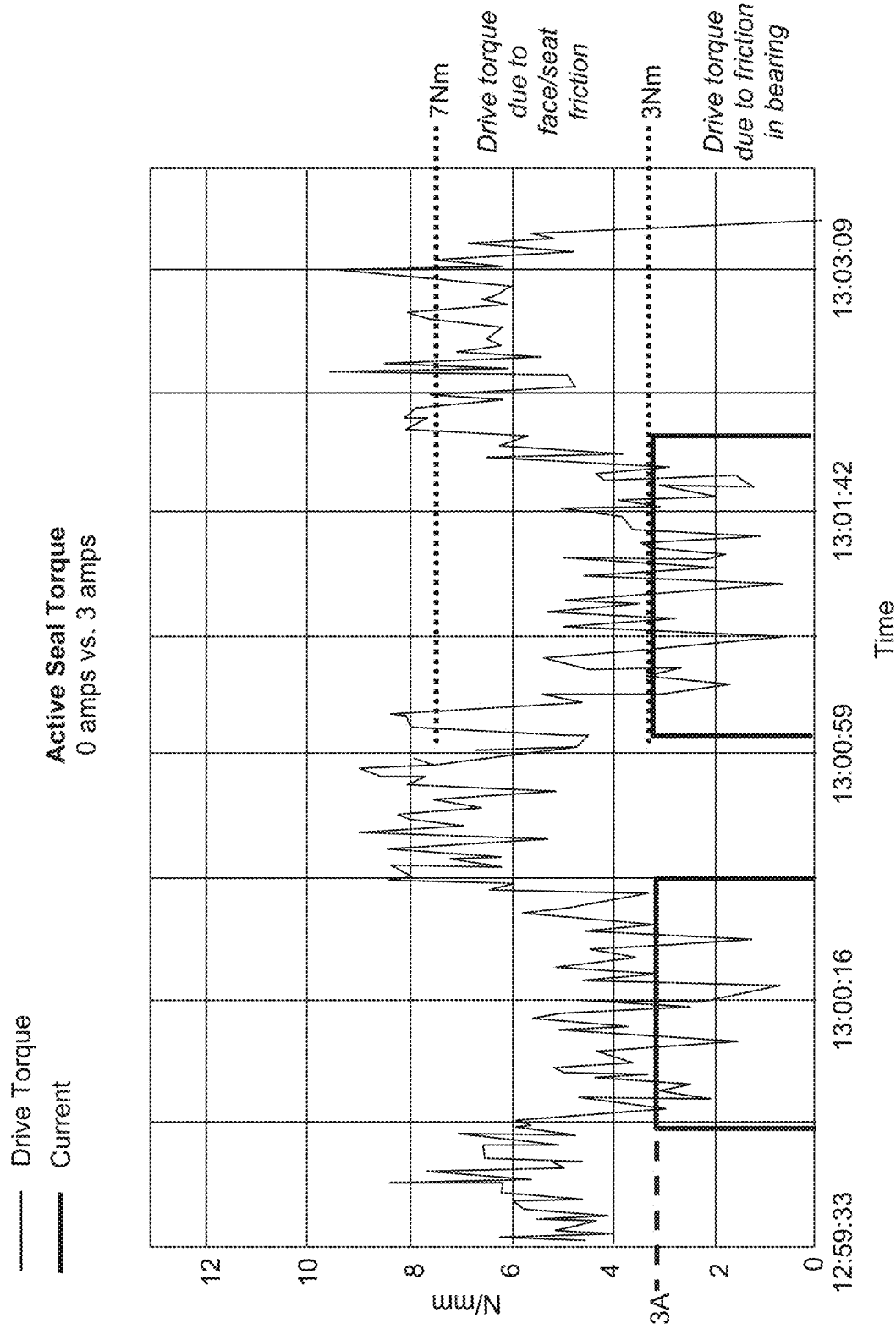

Similar results were detected with respect to leakage, which increased slightly at 3 amperes (as depicted in FIG. 10H) and drive torque, which decreased significantly (from 7 to 3 Nm) when the coil was energized at 3 amperes (as depicted in FIG. 10I). Because the faces start losing contact when the spring preload is fully compensated at 3A, the remaining 3 Nm of torque present when the solenoid is energized is due to friction in the drive train (for example, in the bearings) as opposed to face/seat friction. Embodiments of the present disclosure can therefore enable operators to balance between a desired lift-off speed and desired amount of leakage. For example, embodiments can enable operators to specify a maximum amount of leakage, and automatically control the position of carrier 138 to effect the minimum magnitude of friction possible, while staying within the desired range.

It should be understood that the individual steps used in the methods of the present disclosure may be performed in any order and/or simultaneously, as long as the method remains operable. Furthermore, it should be understood that the apparatus and methods of the present disclosure can include any number, or all, of the described embodiments, as long as the apparatus and/or method remains operable.

As discussed above, in embodiments, a control system can be operably coupled to seal assembly 100 and provided sensors. In one embodiment, the control system and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the claims. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claims.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A method of inhibiting hang-up in a mechanical seal assembly that includes a rotating ring operably coupleable to a shaft of a rotation machine and that presents a first seal face and primary ring axially shift that is axially shiftable relative to the rotating ring and that includes a second seal face that, in combination with the first seal face defines a variable width seal interface, the method comprising:
   receiving, at a controller, a signal indicative of shaft stand-still; and
   providing, by the controller, a pulse-width modulated signal to a magnetic actuator, the signal configured to cause the actuator to apply an oscillating axial force to a carrier attached to the primary ring, wherein the axial force has an amplitude that is sufficient to compensate a spring preload force applied on the carrier by a biasing mechanism;
   wherein an annular magnetic ring is operably coupled to the carrier and includes a ferromagnetic portion;
   wherein the magnetic actuator comprises an annular solenoid arranged coaxially about at least a portion of an outer diameter of the magnetic ring, the solenoid being electrically coupleable to the controller such that the solenoid is selectively magnetic based on the pulse-width modulated signal; and
   wherein the magnetic force urges the magnetic ring and, thus, the carrier axially outboard from a stationary ring to counteract the spring preload force provided by the biasing mechanism.

2. The method of claim 1, wherein the axial force urges the carrier axially inboard and outboard by about 1 mm.

3. The method of claim 1, wherein the signal is further configured to cause the actuator to apply the oscillating axial force to the carrier at a rate between 500 Hz and 1000 Hz.

4. The method of claim 1, wherein the signal indicative of shaft stand-still is a shaft rotational speed signal provided by a tachometer or other speed sensing device.

5. The method of claim 1, further comprising providing the pulse-width modulated signal in response to receiving a signal indicative of slow roll operation.

* * * * *